United States Patent
Huda et al.

(10) Patent No.: US 10,307,712 B2
(45) Date of Patent: Jun. 4, 2019

(54) FLUID CONDITIONING SYSTEMS HAVING CAPS WITH FILTER CARTRIDGE SEALING AND REMOVAL DEVICES AND/OR LOCKING DEVICES

(71) Applicant: Unger Marketing International, LLC, Bridgeport, CT (US)

(72) Inventors: Stephen Huda, Shelton, CT (US); Kai Hirsch, Cologne (DE); James M. Buckley, New Hartford, CT (US)

(73) Assignee: UNGER MARKETING INTERNATIONAL, LLC, Bridgeport, CT (US)

( * ) Notice: Subject to any disclaimer, the term of this patent is extended or adjusted under 35 U.S.C. 154(b) by 153 days.

(21) Appl. No.: 15/350,981

(22) Filed: Nov. 14, 2016

(65) Prior Publication Data
US 2017/0136412 A1    May 18, 2017

Related U.S. Application Data

(60) Provisional application No. 62/254,448, filed on Nov. 12, 2015, provisional application No. 62/342,403, (Continued)

(51) Int. Cl.
*B01D 61/02* (2006.01)
*C02F 1/44* (2006.01)
(Continued)

(52) U.S. Cl.
CPC ......... *B01D 61/025* (2013.01); *B01D 15/361* (2013.01); *B01D 35/1435* (2013.01);
(Continued)

(58) Field of Classification Search
CPC ...... B01D 61/025; B01D 61/10; B01D 61/08; B01D 15/361; B01D 61/12; B01D 61/04;
(Continued)

(56) References Cited

U.S. PATENT DOCUMENTS 3,774,763 A   11/1973   Yall et al.
4,119,517 A   10/1978   Hengst
(Continued)

FOREIGN PATENT DOCUMENTS

CN    203486977    3/2014
CN    204103914    1/2015
(Continued)

OTHER PUBLICATIONS

International Search Report and Written Opinion dated Jan. 24, 2017 for corresponding PCT/US16/61876, 11 pages.
(Continued)

*Primary Examiner* — Madeline Gonzalez
(74) *Attorney, Agent, or Firm* — Cantor Colburn LLP

(57) ABSTRACT

A fluid conditioning unit is provided that includes a housing, a cap, a cartridge device, and a filter cartridge. The cap is threadably secured to and unsecured from the housing by rotation about an axis of the housing. The cap forms a removable seal with the housing when secured thereto. The cartridge device is secured to the cap in a manner that restricts movement of the cartridge device with respect to the cap along the axis but allows rotation of the cartridge device with respect to the cap about the axis. The filter cartridge is removably secured to the cartridge device and is disposed in the housing along the axis.

20 Claims, 19 Drawing Sheets

Related U.S. Application Data filed on May 27, 2016, provisional application No. 62/342,373, filed on May 27, 2016, provisional application No. 62/342,380, filed on May 27, 2016.

(51) Int. Cl.

| | | |
|---|---|---|
| *B01D 15/36* | (2006.01) | |
| *B01D 61/04* | (2006.01) | |
| *B01D 61/12* | (2006.01) | |
| *C02F 1/00* | (2006.01) | |
| *C02F 5/00* | (2006.01) | |
| *B01D 61/08* | (2006.01) | |
| *B01D 35/143* | (2006.01) | |
| *C02F 1/28* | (2006.01) | |
| *C02F 1/42* | (2006.01) | |

(52) U.S. Cl.
CPC ........... *B01D 61/022* (2013.01); *B01D 61/04* (2013.01); *B01D 61/08* (2013.01); *B01D 61/12* (2013.01); *C02F 1/001* (2013.01); *C02F 1/008* (2013.01); *C02F 1/441* (2013.01); *C02F 5/00* (2013.01); *B01D 2201/301* (2013.01); *B01D 2201/347* (2013.01); *B01D 2201/4076* (2013.01); *B01D 2311/14* (2013.01); *B01D 2311/246* (2013.01); *B01D 2311/2623* (2013.01); *B01D 2311/2649* (2013.01); *B01D 2313/02* (2013.01); *B01D 2313/04* (2013.01); *B01D 2313/125* (2013.01); *B01D 2313/20* (2013.01); *B01D 2313/21* (2013.01); *B01D 2313/24* (2013.01); *B01D 2313/44* (2013.01); *B01D 2317/04* (2013.01); *C02F 1/283* (2013.01); *C02F 1/42* (2013.01); *C02F 2201/004* (2013.01); *C02F 2201/006* (2013.01); *C02F 2201/008* (2013.01); *C02F 2209/003* (2013.01); *C02F 2209/008* (2013.01); *C02F 2209/03* (2013.01); *C02F 2209/10* (2013.01); *C02F 2307/06* (2013.01); *Y02W 10/37* (2015.05)

(58) Field of Classification Search
CPC .............. B01D 61/022; B01D 2313/20; B01D 2311/14; B01D 2311/2623; B01D 2311/2649; B01D 2317/04; B01D 2313/21; B01D 2313/02; B01D 2313/125; B01D 2313/04; B01D 2313/24; B01D 2313/44; C02F 1/001; C02F 1/008; C02F 1/441; C02F 5/00; C02F 2201/004; C02F 2209/10; C02F 2201/006; C02F 1/42; C02F 1/283; C02F 2209/008; C02F 2209/003; C02F 2307/06; C02F 2209/03; C02F 2201/008; Y02W 10/37
USPC .............. 210/440, 442, 444, 321.78, 321.87
See application file for complete search history.

(56) References Cited

U.S. PATENT DOCUMENTS

| | | |
|---|---|---|
| 4,722,128 A | 2/1988 | Keller |
| 4,801,375 A | 1/1989 | Padilla |
| 4,836,923 A | 6/1989 | Popoff et al. |
| 4,967,960 A | 11/1990 | Futrell |
| 4,988,427 A | 1/1991 | Wright |
| 5,085,769 A | 2/1992 | Klausen et al. |
| 5,399,260 A | 3/1995 | Eldredge et al. |
| 5,503,735 A | 4/1996 | Vinas et al. |
| 5,547,584 A | 8/1996 | Capehart |
| 6,027,642 A | 2/2000 | Prince et al. |
| 6,228,255 B1 | 5/2001 | Peterson et al. |
| 6,273,126 B1 | 8/2001 | Shen |
| 6,372,132 B1 | 4/2002 | Williams |
| 6,824,695 B2 | 11/2004 | Tempest, Jr. |
| 7,100,427 B2 | 9/2006 | Kahn et al. |
| 7,104,115 B2 | 9/2006 | Kahn et al. |
| 7,237,682 B2* | 7/2007 | Reynolds ............... B01D 29/21 210/450 |
| 7,249,000 B2 | 7/2007 | Kahn et al. |
| 7,632,410 B2 | 12/2009 | Heiss |
| 7,908,724 B2 | 3/2011 | Isabelle |
| 7,955,503 B2 | 6/2011 | Onota et al. |
| 8,469,331 B2 | 6/2013 | Burbank et al. |
| 8,486,275 B2 | 7/2013 | Wolf |
| 8,529,770 B2 | 9/2013 | Yencho |
| 8,900,459 B2 | 12/2014 | Tenne |
| 2003/0024870 A1 | 2/2003 | Reinhart |
| 2003/0196947 A1 | 10/2003 | Gundrum et al. |
| 2005/0016906 A1 | 1/2005 | Gettman |
| 2007/0045165 A1 | 3/2007 | Beall |
| 2007/0090059 A1 | 4/2007 | Plummer et al. |
| 2009/0008318 A1 | 1/2009 | Anes et al. |
| 2010/0109601 A1 | 5/2010 | Coyle et al. |
| 2012/0284982 A1 | 11/2012 | Chen et al. |
| 2013/0126430 A1 | 5/2013 | Kenley et al. |
| 2014/0083846 A1 | 3/2014 | Moon et al. |
| 2015/0336820 A1 | 11/2015 | Grabosch et al. |

FOREIGN PATENT DOCUMENTS

| | | |
|---|---|---|
| EP | 0331136 | 9/1989 |
| EP | 0352779 | 1/1990 |
| WO | 02100780 | 12/2002 |
| WO | 2014110074 | 7/2014 |
| WO | 2015157680 A1 | 10/2015 |

OTHER PUBLICATIONS

International Search Report and Written Opinion dated Mar. 9, 2017 for corresponding PCT/US16/61864, 10 pages.
International Search Report and Written Opinion dated Mar. 14, 2017 for corresponding PCT/US16/61868, 12 pages.
Extended European Search Report for Application No. 16865222.0 dated Nov. 6, 2018; 9 pgs.
Supplementary European Search Report for Application No. 16865212.1 dated Nov. 9, 2018; 9 pgs.

* cited by examiner

FLUID CONDITIONING SYSTEMS HAVING CAPS WITH FILTER CARTRIDGE SEALING AND REMOVAL DEVICES AND/OR LOCKING DEVICES

CROSS REFERENCE TO RELATED APPLICATIONS

This application claims the benefit of U.S. Provisional Application No. 62/254,448 filed on Nov. 12, 2015, claims the benefit of U.S. Provisional Application No. 62/342,403 filed on May 27, 2016, claims the benefit of U.S. Provisional Application No. 62/342,373 filed on May 27, 2016, and claims the benefit of U.S. Provisional Application No. 62/342,380 filed on May 27, 2016, the entire contents of which are incorporated by reference herein.

BACKGROUND

1. Field of the Disclosure

The present disclosure is related to fluid conditioning systems. More particularly, the present disclosure is related to caps for such fluid conditioning systems, where the caps include filter cartridge sealing and removal devices and/or locking devices.

2. Description of Related Art

Fluid conditioners that treat an incoming fluid, such as tap water, are known. As used herein, the term "conditioned fluid" shall mean a fluid that has been filtered, (distilled), deionized, demineralized (e.g., via reverse osmosis), softened, anti-scaled, exposed to any other fluid treatment process—including the addition of one or more additives or components, and any combinations thereof.

In many prior art systems, the fluid conditioner conditions the fluid by filtering. Here, the fluid conditioner forces the fluid through a filter cartridge that is sealed or housed within a container.

Additionally, many prior art systems often have a cap that can be selectively removed to allow access to the interior of the container so that the filter cartridge can be installed/removed and can be selectively secured to the container to seal filter cartridge in the container in a fluid tight manner.

Since the fluid in the system may be pressurized, the removable cap often includes a locking device, which mitigates inadvertent removal of the cap—either by the operator or by the vibration and/or pressure acting on the cap.

It has been determined by the present disclosure that the sealing and removal of filter cartridges from the interior of the container can be made difficult by the force of the cartridge seals and the inner wall of the container. This force can be compounded by the length of the cartridge, which increases the distance that the seals must be displaced through the container into the desired position. Advantageously, present disclosure provides fluid conditioning systems that have a cap with a filter cartridge sealing and removal device.

Additionally, it has been determined by the present disclosure that the caps of the prior art have complicated locking devices that require, for example, two hand operation and/or multiple locking and unlocking steps. Advantageously, present disclosure also provides fluid conditioning systems that have caps with improved locking devices.

Accordingly, the present disclosure provides for fluid conditioning systems that provide enhanced utility and ease of use as compared to prior art fluid conditioners.

SUMMARY

A fluid conditioning system is provided that includes a reverse osmosis unit, having a cap with a filter cartridge sealing and removal device. The filter cartridge sealing and removal device is structured to allow the simple action of installing the cap to seal the filter cartridge and the removal of the cap to withdraw the cartridge. Moreover, the filter cartridge sealing and removal device is structured to minimize the axial and rotational friction imparted to the seals during the installation and removal.

A fluid conditioning system is also provided that—either alone or in combination with the aforementioned filter cartridge sealing and removal device—includes a cap with a locking device. The locking device is structures so that the simple action of unscrewing the cap also moves the locking device to an unlocked state, which simplifies the use of the system.

In some embodiments, a fluid conditioning unit is provided that includes a housing, a cap, a cartridge device, and a filter cartridge. The cap is threadably secured to and unsecured from the housing by rotation about an axis of the housing. The cap forms a removable seal with the housing when secured thereto. The cartridge device is secured to the cap in a manner that restricts movement of the cartridge device with respect to the cap along the axis but allows rotation of the cartridge device with respect to the cap about the axis. The filter cartridge is removably secured to the cartridge device and is disposed in the housing along the axis.

In some embodiments either alone or in combination with one or more of the aft mentioned embodiments, the unit can include a first seal for removably sealing the cartridge device and an inner surface of the housing and a second seal for removably sealing the cartridge device and the filter cartridge.

In some embodiments either alone or in combination with one or more of the afore and/or aft mentioned embodiments, the second seal is sufficient so that the filter cartridge remains attached to the cartridge device during removal of the cap from the housing.

In some embodiments either alone or in combination with one or more of the afore and/or aft mentioned embodiments, the cap includes first and second portions that are secured to one another in a manner that secures the cartridge device and the cap to one another to prevent movement of the cartridge device with respect to the cap along the axis but allow rotation of the cartridge device with respect to the cap about the axis.

In some embodiments either alone or in combination with one or more of the afore and/or aft mentioned embodiments, the filter cartridge is a cartridge selected from the group consisting of a particle filter cartridge, a chlorine filter cartridge, and an ion removing filter cartridge.

In some embodiments either alone or in combination with one or more of the afore and/or aft mentioned embodiments, the cartridge device includes a manifold that collect two separate fluid streams from the filter cartridge and to separately direct the two separate fluid streams from the housing.

In some embodiments either alone or in combination with one or more of the afore and/or aft mentioned embodiments, the filter cartridge is a reverse osmosis membrane. The housing can include an incoming water inlet, a concentrate outlet, and a permeate outlet. The incoming water inlet is in fluid communication with one end of the reverse osmosis membrane, while the cartridge device is in fluid communication with an opposite end of the reverse osmosis membrane.

In some embodiments either alone or in combination with one or more of the afore and/or aft mentioned embodiments, the cartridge device includes a manifold that directs concentrate from the reverse osmosis membrane to the concentrate outlet and directs permeate from the reverse osmosis membrane to the permeate outlet. Here, the cartridge device can seal the concentrate and permeate from one another.

In some embodiments either alone or in combination with one or more of the afore and/or aft mentioned embodiments, the cap can include a locking device that locks the cap to the housing once the cap is threadably secured to the housing.

In some embodiments either alone or in combination with one or more of the afore and/or aft mentioned embodiments, the locking device includes a handle usable by a user to impart threading and unthreading forces to the cap.

In some embodiments either alone or in combination with one or more of the afore and/or aft mentioned embodiments, the locking device is configured so that the unthreading forces on the handle also moves the locking device to an unlocked state.

In some embodiments either alone or in combination with one or more of the afore and/or aft mentioned embodiments, the locking device is configured so that the threading forces on the handle moves the locking device to a locked state once the cap is threadably secured to the housing.

In some embodiments either alone or in combination with one or more of the afore and/or aft mentioned embodiments, the cap can include a pressure relief device configured to relieve pressure from within housing when removing the cap from the housing.

In some embodiments either alone or in combination with one or more of the afore and/or aft mentioned embodiments, the pressure relief device is positioned adjacent to the handle.

In some embodiments either alone or in combination with one or more of the afore and/or aft mentioned embodiments, the cap can include first and second portions that are secured to one another in a manner that secures the cartridge device and the cap to one another to prevent movement of the cartridge device with respect to the cap along the axis but allow rotation of the cartridge device with respect to the cap about the axis. Here, the locking device can include a locking arm secured between the first and second portions.

In another embodiment either alone or in combination with one or more of the afore and/or aft mentioned embodiments, a fluid conditioning unit is provided that includes a housing and a cap. The housing has a first thread and a locking feature, while the cap has a second thread, a handle and a locking arm. The first and second threads are selectively engagable and disengageable from one another. The locking arm is movable between a locked position and an unlocked position. The locking arm, when in the locked position, is receivable in the locking feature to prevent unthreading of the cap from the housing. Conversely, the locking arm, when in the unlocked position, is free from the locking feature to allow unthreading of the cap from the housing. The handle is movable, with respect to the cap during threading and unthreading of the cap from the housing, between a first position and a second position. The first position corresponds to the locked position and the second position corresponds to the unlocked position so that when a user applies an unthreading force to the handle, the handle moves to the second position and moves the arm to the unlocked position and so that when a user applies a threading force to the handle, the handle moves to the first position and moves the arm to the locked position.

In some embodiments either alone or in combination with one or more of the afore and/or aft mentioned embodiments, the cap can include a guide stud operatively securing the handle and the locking arm to the cap. The handle has a slot through which the stud is received so that the handle can move, with respect to the cap during threading and unthreading of the cap from the housing, by the stud sliding in the slot between the first and second positions.

In some embodiments either alone or in combination with one or more of the afore and/or aft mentioned embodiments, the cap can include an outer ring having first and second portions. The guide stud secures the handle, the locking arm, and the first and second portions of the outer ring to one another.

In some embodiments either alone or in combination with one or more of the afore and/or aft mentioned embodiments, the locking arm is held in position between the first and second portions in a pivotable manner with the locking arm normally biased to the locked position.

In some embodiments either alone or in combination with one or more of the afore and/or aft mentioned embodiments, the handle and the first and second portions include corresponding cam surfaces that interact with one another during movement of the handle between the first and second positions to move the arm between the locked and unlocked positions, respectively.

In some embodiments either alone or in combination with one or more of the afore and/or aft mentioned embodiments, the handle is normally biased to the first position, which normally biases the arm to the locked position.

The above-described and other features and advantages of the present disclosure will be appreciated and understood by those skilled in the art from the following detailed description, drawings, and appended claims.

DETAILED DESCRIPTION

Figure 1:
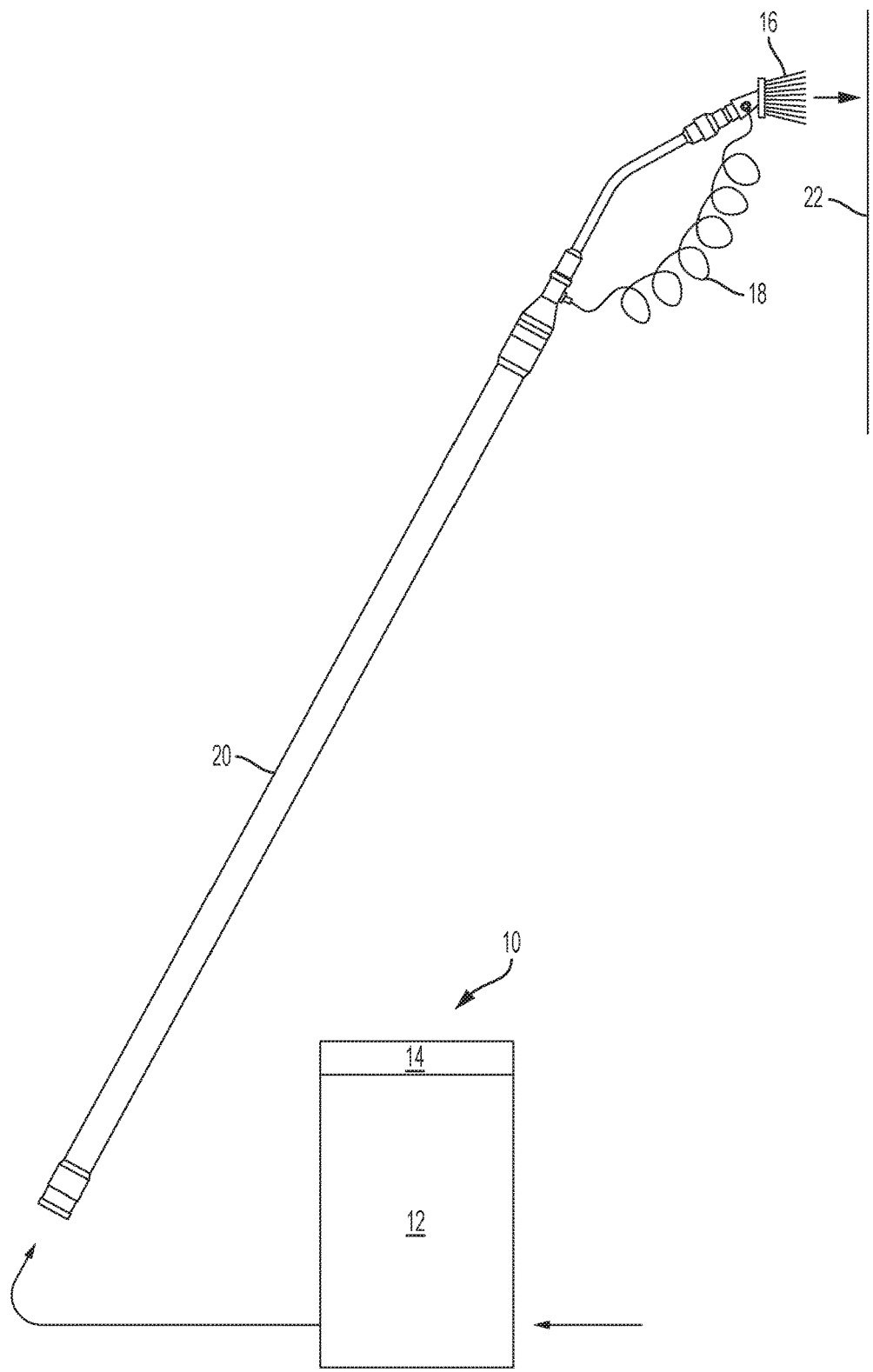
FIG. 1 is a schematic depiction of an exemplary embodiment of a fluid conditioning system according to the present disclosure in use with a fluid fed cleaning brush on an extension pole.
Figure 2:
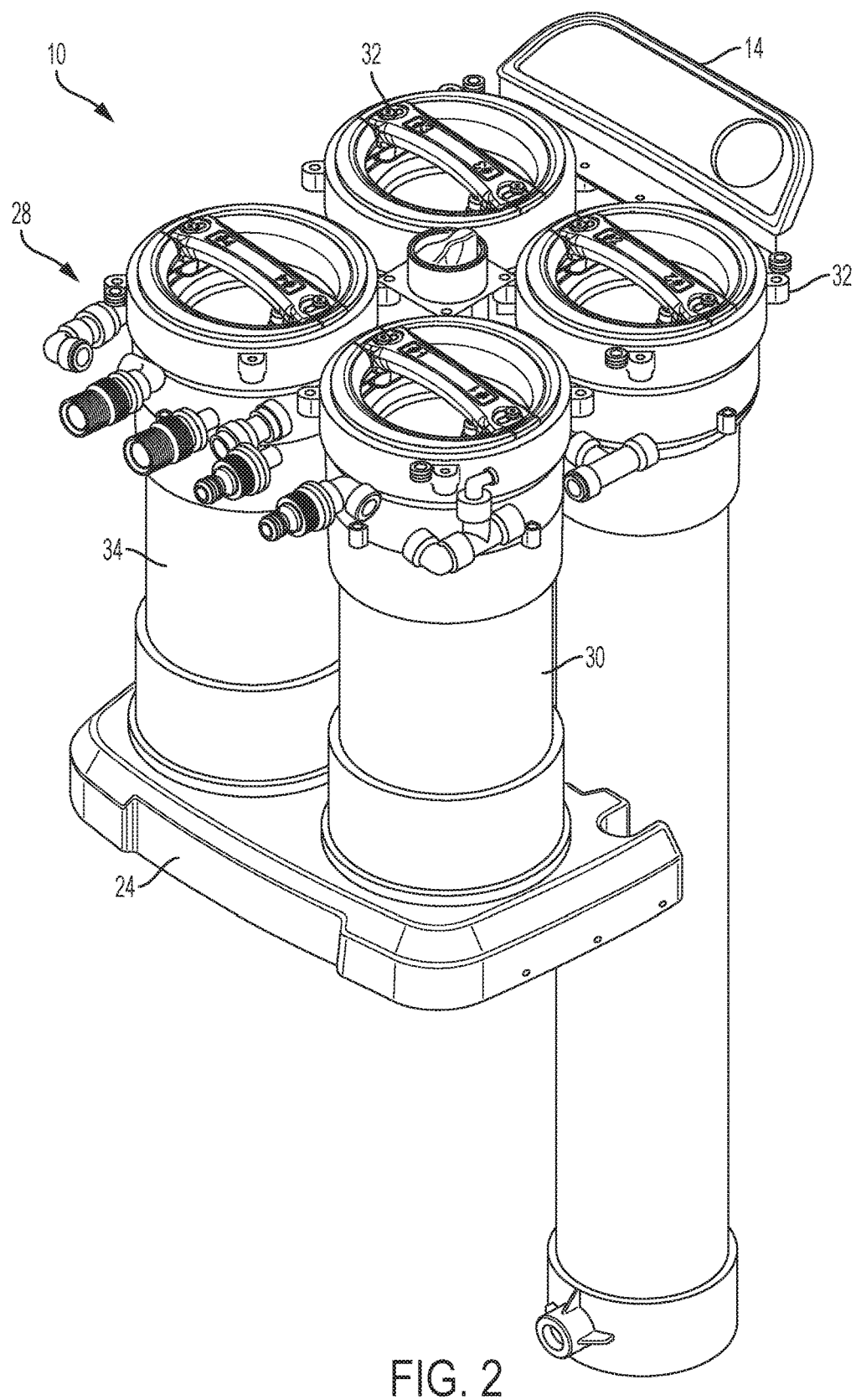
FIG. 2 is a top, partial perspective view of an exemplary embodiment of a fluid conditioning system according to the present disclosure.

Referring to the drawings and in particular to FIGS. 1 and 2, an exemplary embodiment of a fluid conditioning system according to the present disclosure is shown and is referred to as reference numeral 10. System 10 includes a fluid conditioner 12 in communication with a controller 14, which is configured to operate system 10.

Conditioner 12 is shown by way of example in fluid communication with a fluid-fed cleaning brush 16 via one or more tubes 18 and is secured to an extension pole 20 so that the conditioned fluid can clean a desired surface 22. Of course, other uses of system 10 are contemplated by the present disclosure.

As discussed above, "conditioned fluid" means fluid that has been filtered, deionized, demineralized, softened, exposed any other fluid treatment process—including the addition of one or more additives or components, and any combinations thereof. Accordingly, conditioner 12 can include a particle filter, a chlorine filter (i.e., activated carbon), an ion remover (e.g., deionization resin and/or reverse osmosis membrane), a UV sterilizer, and any combinations thereof. When disclosing "particle filtration", it is contemplated by the present disclosure for conditioner 12 to be sufficient for any desired filtration level such as, but not limited to, nano-filtration, ultra-filtration, micro-filtration, and others.

By way of example, conditioner 12 can be a pure water system as shown and described in Applicant's own U.S. application Ser. No. 14/684,071 filed on Apr. 10, 2015, the contents of which are incorporated in their entirety herein. Conditioner 12 can also include the system as shown and described in Applicant's own U.S. application Ser. No. 62/160,832 filed on May 13, 2015, the contents of which are incorporated in their entirety herein.

Conditioner 12 is shown in FIG. 2 having a frame 24 retaining an optional motorized pump 26 and a plurality of conditioning units 28. It is contemplated by the present disclosure for system 10 to include no pump, but rather to operate on line pressure alone. Further, it is contemplated by the present disclosure for system 10, when pump 26 is present, to have an A/C pump, D/C pump, or both—where the pump can be controlled to allow flow at line pressure or to assist the flow as desired.

In the illustrated embodiment, units 28 include a pre-filter unit 30, at least one reverse osmosis (RO) unit 32 (two shown), and a deionizing (DI) unit 34. The illustrated embodiment includes, in a direction of flow through conditioner 12, pre-filter unit 30, pump 26, RO units 32, and DI unit 34. Of course, other positions and combinations of pump 26 and units 30, 32, 34 are contemplated by the present disclosure.

Conditioner 12 is preferably controlled and monitored by controller 14 to selectively pass incoming fluid through one or more of units 30, 32, 34 to provide conditioned fluid of desired quality.

Figure 3:
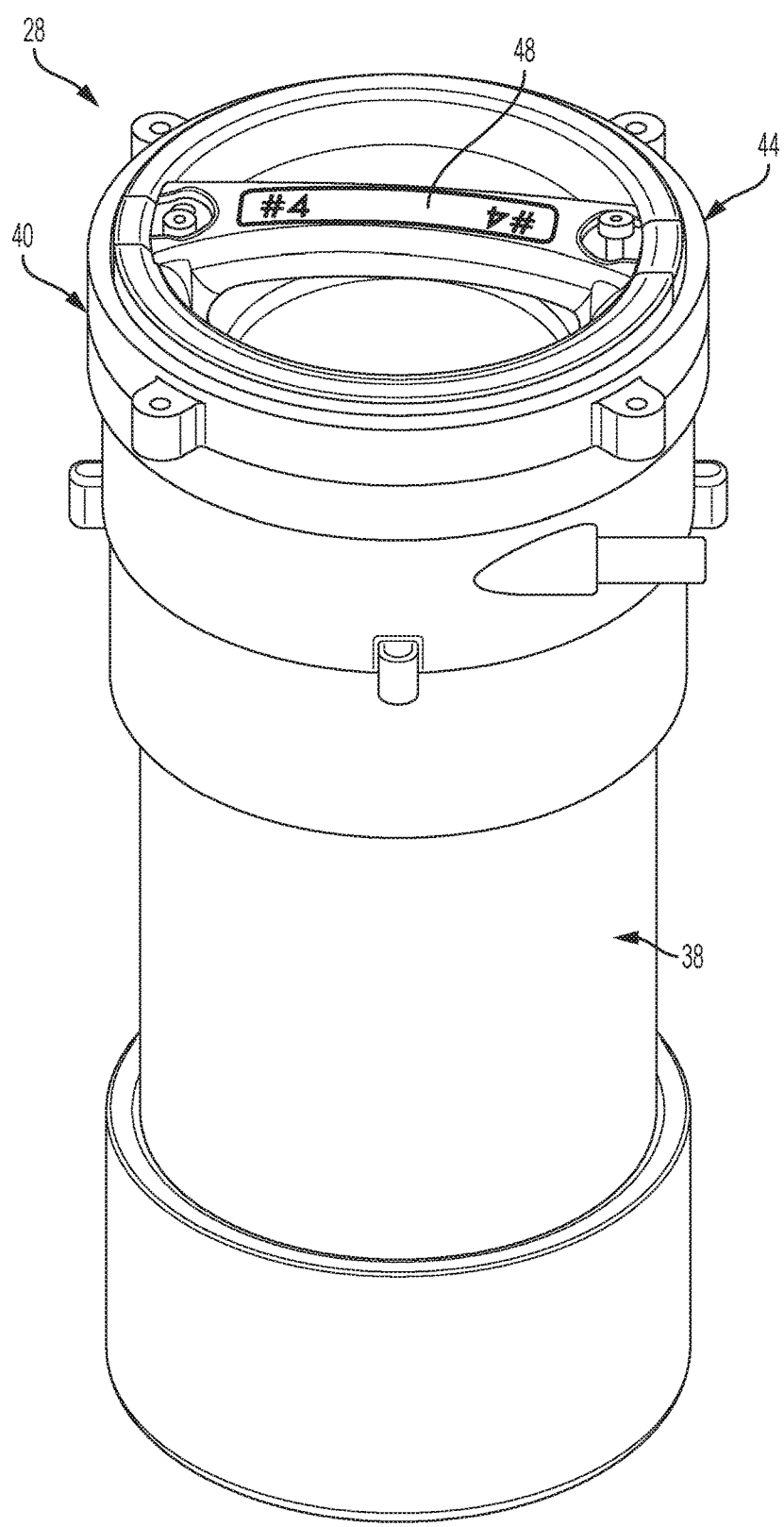
FIG. 3 is a top perspective view of a single conditioning unit having an exemplary embodiment of a cap according to the present disclosure.
Figure 4:
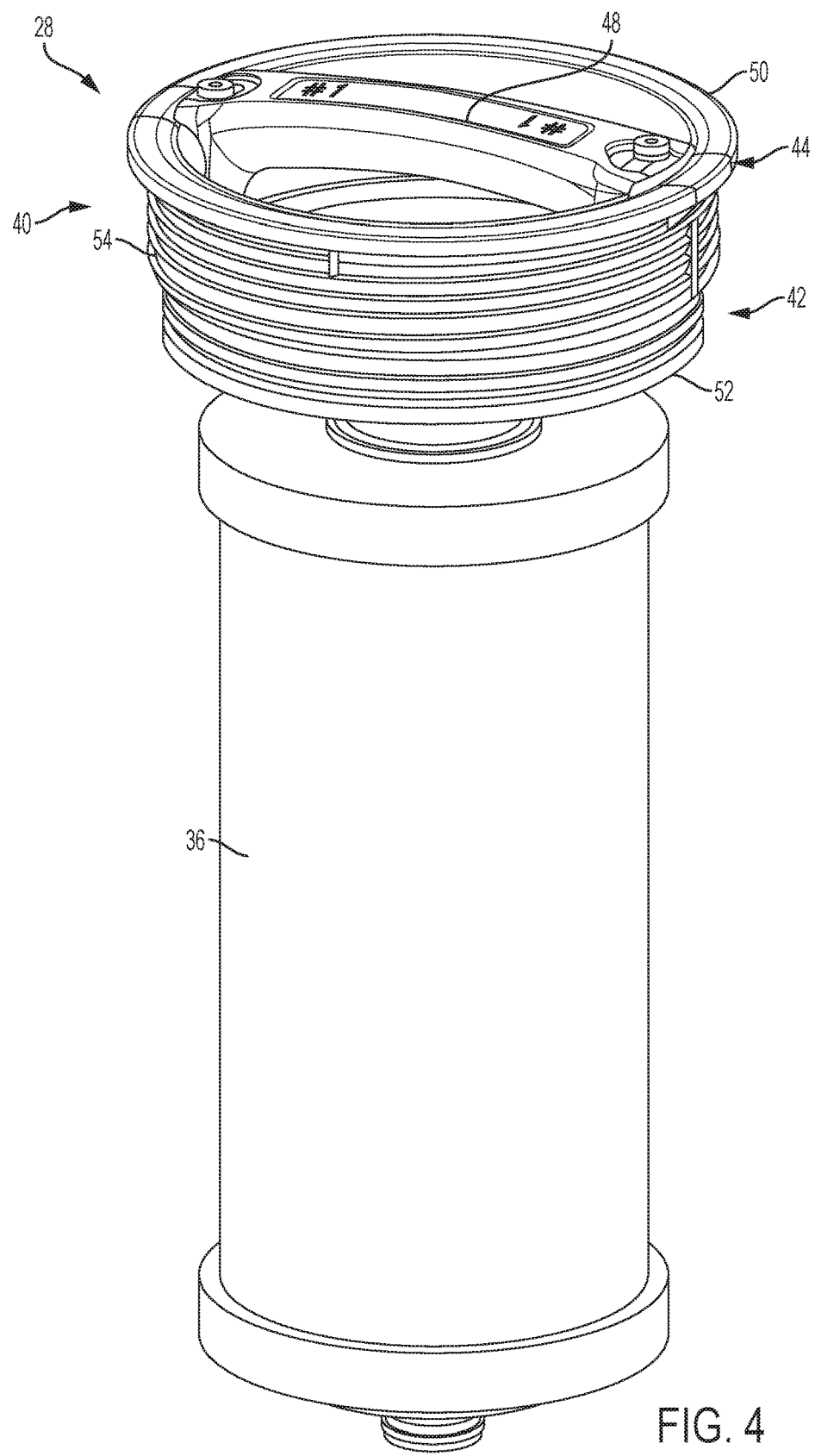
FIG. 4 is a top perspective view of the conditioning unit of FIG. 3 having the container removed to illustrate a filter cartridge sealing and removal device according to the present disclosure.
Figure 5:
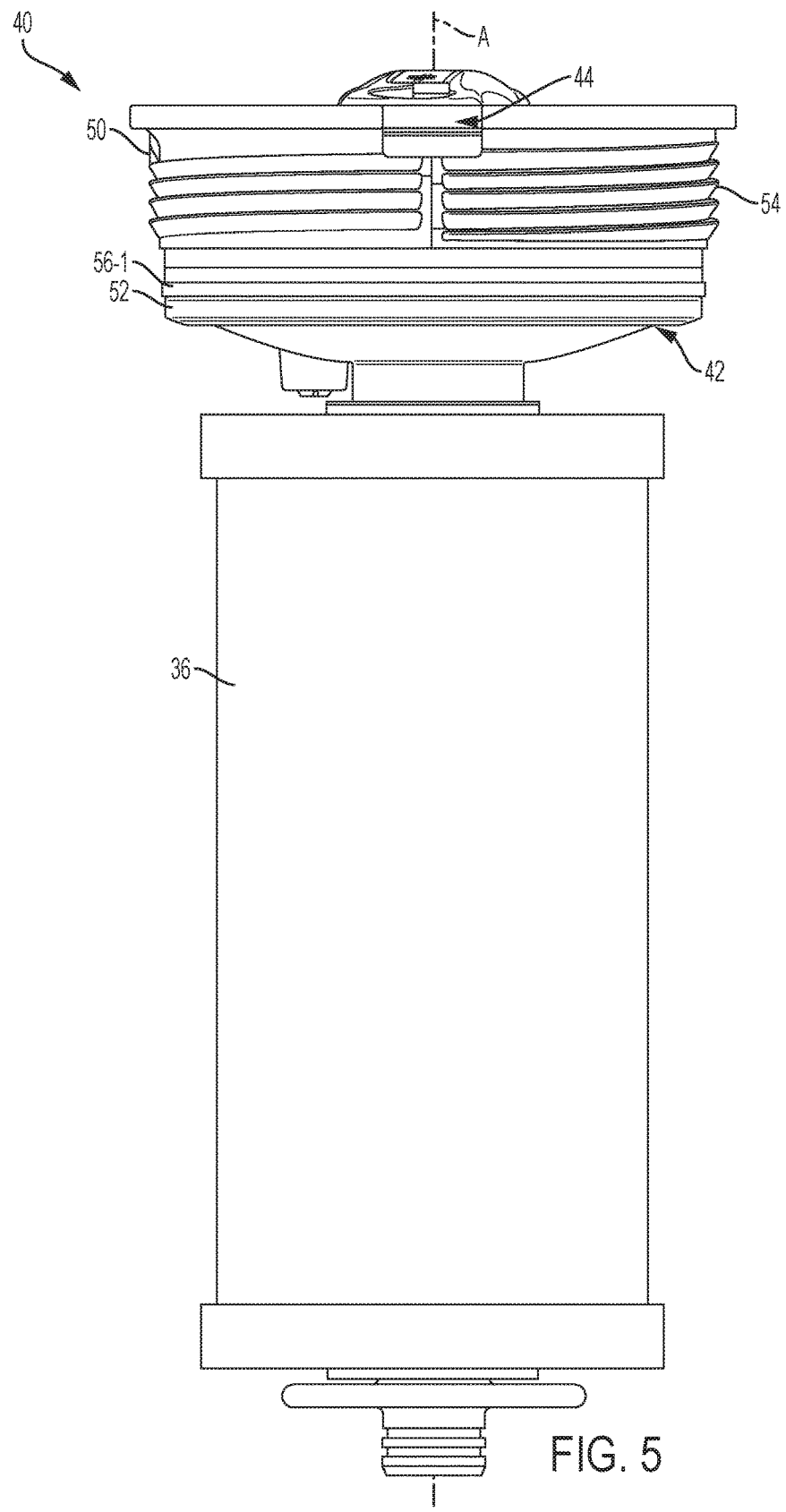
FIG. 5 is a side view of the conditioning unit of FIG. 4.

Turning now to FIGS. 3 and 4, conditioning unit 28 is shown configured for use with a filter cartridge 36 in a housing 38. As discussed above, filter cartridge 36 can be a particle filter cartridge, a chlorine filter cartridge, an ion removing filter cartridge (e.g., deionization resin and/or reverse osmosis membrane), other filter cartridges, and any combinations thereof. Here, unit 28 is shown in use with an exemplary embodiment of cap 40 according to the present disclosure. Cap 40 includes a filter cartridge sealing and removal device 42 and/or a locking device 44.

Cartridge device 42 advantageously seals or attaches cartridge 36 to cap 40 in a manner that allows the simple action of installing and removing the cap from housing 38 to seal and remove the cartridge from the housing in an axial manner (i.e. along axis A) and, preferably with minimal rotation about the axis as will be described in more detail below.

Locking device 44 is advantageously configured so that the simple action of unscrewing cap 40 from housing 38 also moves the locking device to an unlocked state, but the action of screwing the cap to the housing leaves the locking device in a locked state.

The details of cap 40 having cartridge sealing and removal device 42 are described with simultaneous reference to FIGS. 4-8.

Cap 40 can include, in some embodiments, a pressure relief device 46, which the operator can use to relieve pressure from within conditioning unit 28 before removing cap 40 from housing 38. Cap 40 can also include, in some embodiments, a handle 48 that assists the user to grip the cap during installation and removal. Preferably, pressure relief device 46 is positioned adjacent to handle 48 so that the user can use the same hand with which they grasp the handle to depress and, thus, open the pressure relief device.

Cap 40 includes a first portion 50 and a second portion 52. First portion 50 is configured to secure cap 40 to housing 38, while second portion 52 is configured to secure the cap to filter cartridge 36.

First portion 50 and housing 38 have corresponding threads 54 configured to removably secure the cap and housing to one another in a fluid tight manner via rotation about the axis. It should be recognized that first portion 50 and housing 38 are described by way of example only as having corresponding threads 54. Of course, it is contemplated by the present disclosure for first portion 50 and housing 38 to include any corresponding interlocking rotational features.

Second portion 52 includes one or more seals 56-1 shown in FIGS. 5-8 (only one shown). Seal 56-1 is illustrated as an o-ring or gasket that seals second portion 52 to an inner surface 58 of housing 38 when cap 40 is secured to the housing. In some embodiments, inner surface 58 includes a sloped or tapered lead-in 60, which allows cap 40 to be substantially threaded onto housing 38 before seal 56-1 is completely engaged to surface 58. In this manner, cap 40 is configured to minimize the axial friction imparted along axis A to seal 56-1 by the interaction of the seal on the inner surface 58 during installation of the cap. Since device 42 rotates freely with respect to cap 40, installation of the cap only requires seal 56-1 to move with respect to surface 58 axially along axis A and, not, rotationally, which reduces the frictional force imparted to the seal.

It should be recognized that seal 56-1 is illustrated on an outer diameter of second portion 52 and surface 58 is shown as an inner diameter of housing 38. Of course, it is contemplated by the present disclosure for seal 56-1 and surface 58 to have other configurations that minimize the axial friction imparted to the seal. For example, surface 58 can be a horizontal surface (e.g. normal to axis A) and seal 56-1 can be on that surface or on a bottom face of second portion 52. Moreover, it is contemplated by the present disclosure for seal 56-1 to be on housing 38 and surface 58 to be on device 42.

Figure 6:
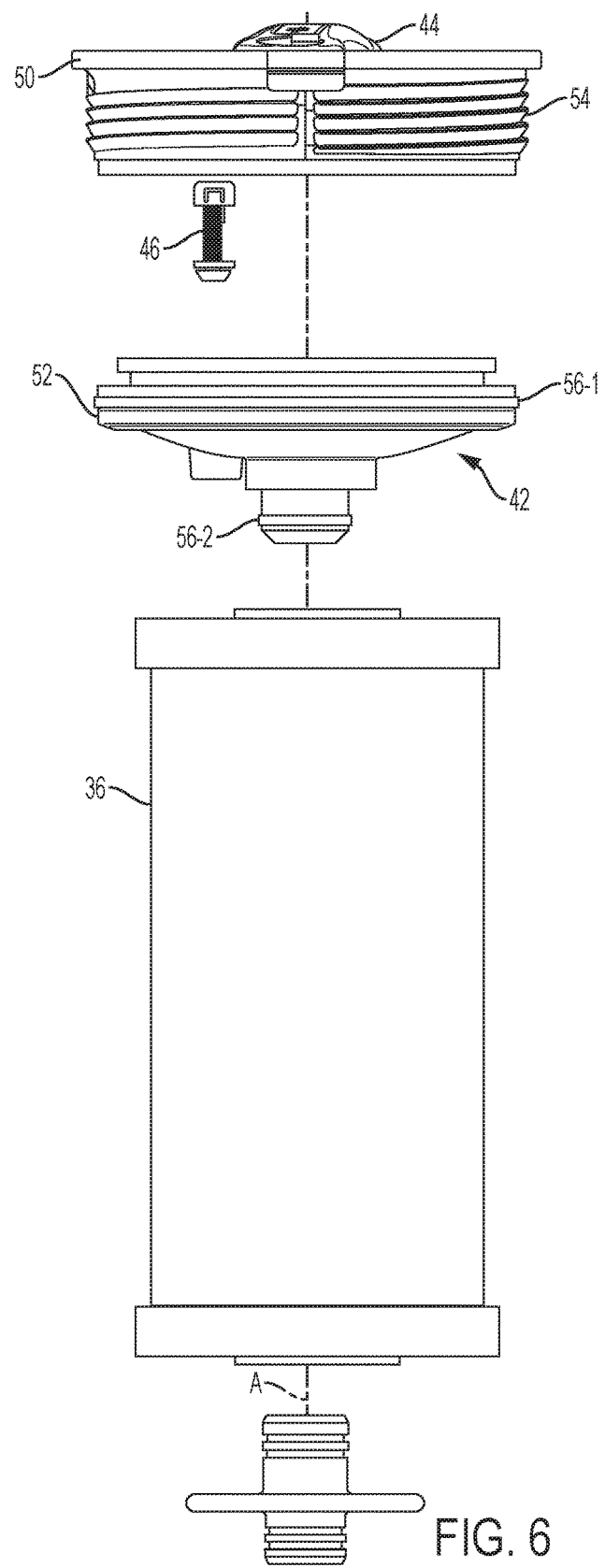
FIG. 6 is an exploded view of the condition unit of FIG. 4.
Figure 7:
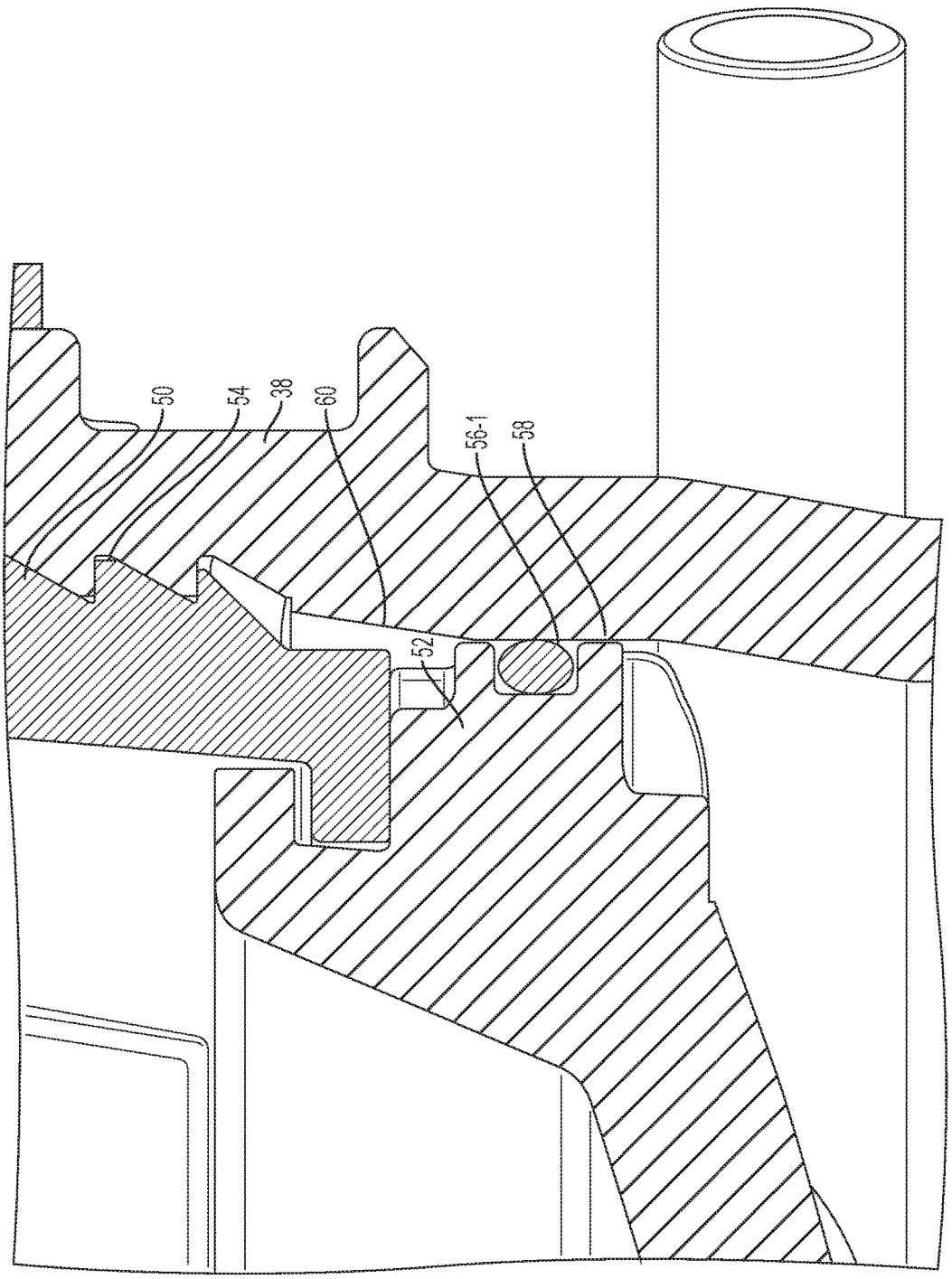
FIG. 7 is a magnified sectional view of the conditioning unit of FIG. 3 in a sealed state.
Figure 8:
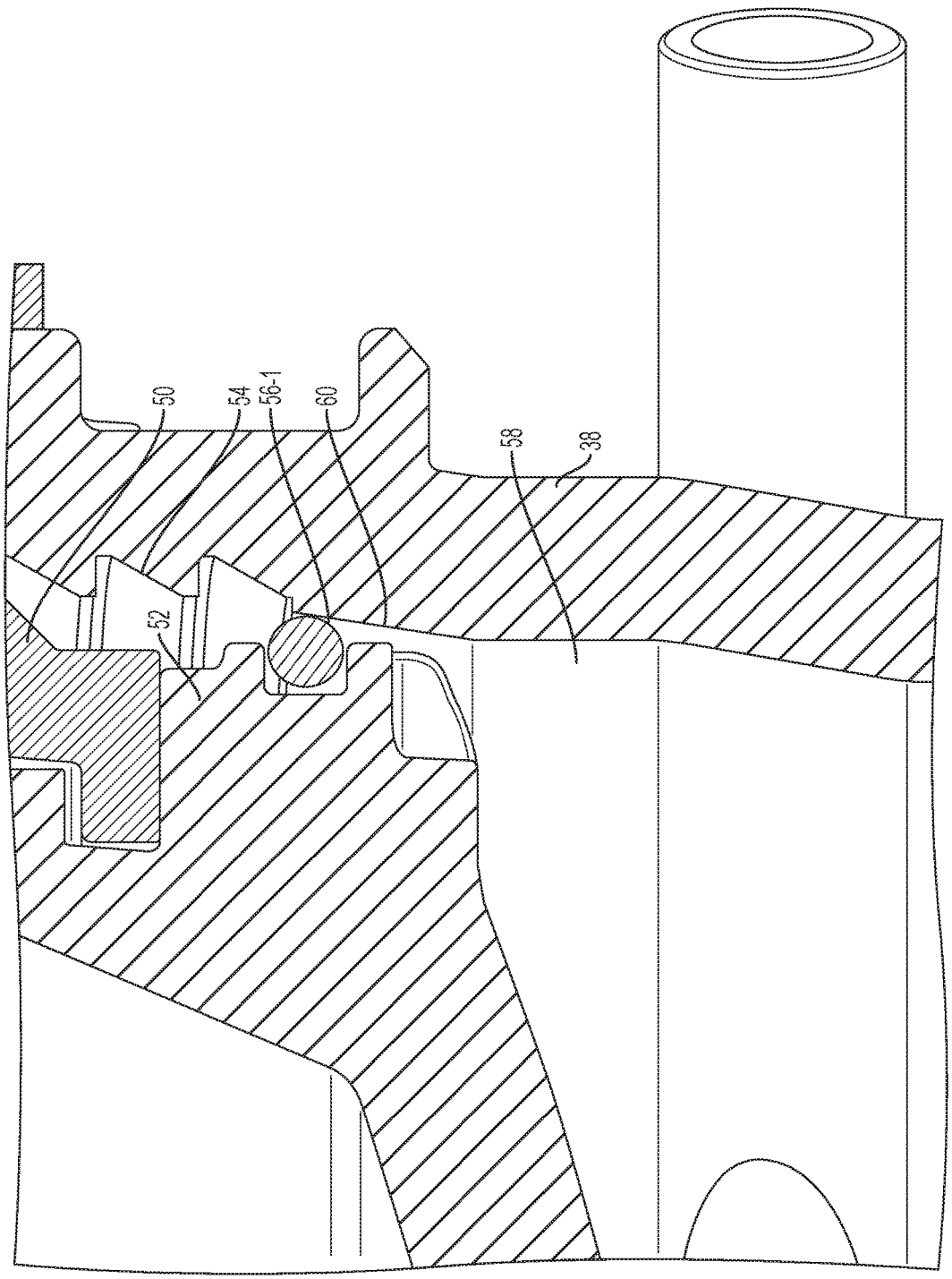
FIG. 8 is a magnified sectional view of the conditioning unit of FIG. 3 in an unsealed state.

Second portion 52 further includes one or more seals 56-2 shown in FIG. 6 (only one shown). Seal 56-2 is illustrated as an o-ring or gasket that seals second portion 52 to an inner surface of cartridge 36 so as to attach the second portion and the cartridge to one another. Thus, second portion 52 of cap 40 and cartridge 36 are attached to one another by insertion of seal 56-2 into the cartridge. Preferably, the attachment between seal 56-2 and cartridge 36 is stronger than the attachment between seal 56-1 and inner surface 58 of housing 38. In this manner, cartridge 36 remains attached to second portion 52 of cap 40 during and after removal of the cap from housing 38.

Although not illustrated, it is further contemplated by the present disclosure for the attachment of second portion 52 and/or cartridge 36 to have one or more other interlocking features. Similar to the discussion above regarding seal 56-1, since device 42 rotates freely with respect to cap 40, installation of the cap only requires seal 56-2 to move with respect to the inner surface of cartridge 36 axially along axis A and, not, rotationally, which reduces the frictional force imparted to the seal.

First and second portions 50, 52 are secured to one another in a manner that allows the portions to rotate with respect to one another, but remain secured to one another. Thus, the rotation of first portion 50 about axis A during rotational engagement of cap 40 and housing 38 results in second portion 52—with cartridge 36 attached thereto—moving in the axial direction along axis A. Accordingly, cap 40 acts to install and remove cartridge 36 axially into housing 38 via the simple rotation of first portion 50 of the cap and housing with respect to one another about axis A. Moreover, the rotation first portion 50 is not imparted to second portion 52 such that cap 40 is further configured to minimize the rotational friction imparted about axis A to seals 56-1 and 56-2 by the interaction of seal 56-1 on the inner surface 58 and seal 56-2 on the inner surface of cartridge 36, as well as any seals on filter cartridge 36, during installation of the cap.

In short, cap 40 is configured to perform multiple functions in a simple, easy to use form—namely to close housing 38 in a fluid tight manner, drive cartridge 36 into and out of the housing during the closing of the housing, and minimize damage to seals 56-1, 56-2 and reduce the forces and/or torque required during the installation and removal process.

Figure 9:
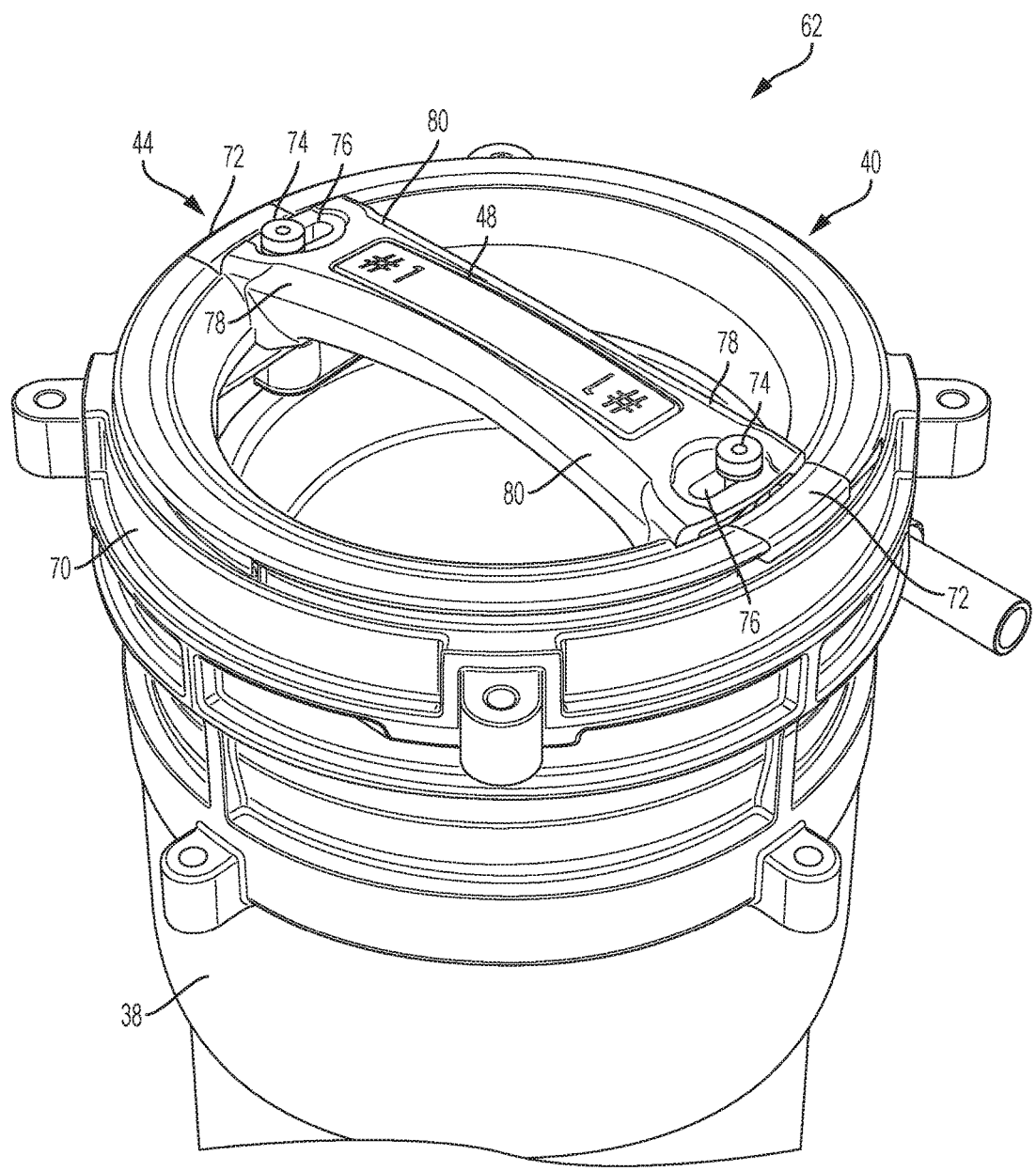
FIG. 9 is a top perspective view of the conditioning unit of FIG. 3 illustrating an exemplary embodiment of a locking device according to the present disclosure with the cap shown in a locked state.
Figure 10:
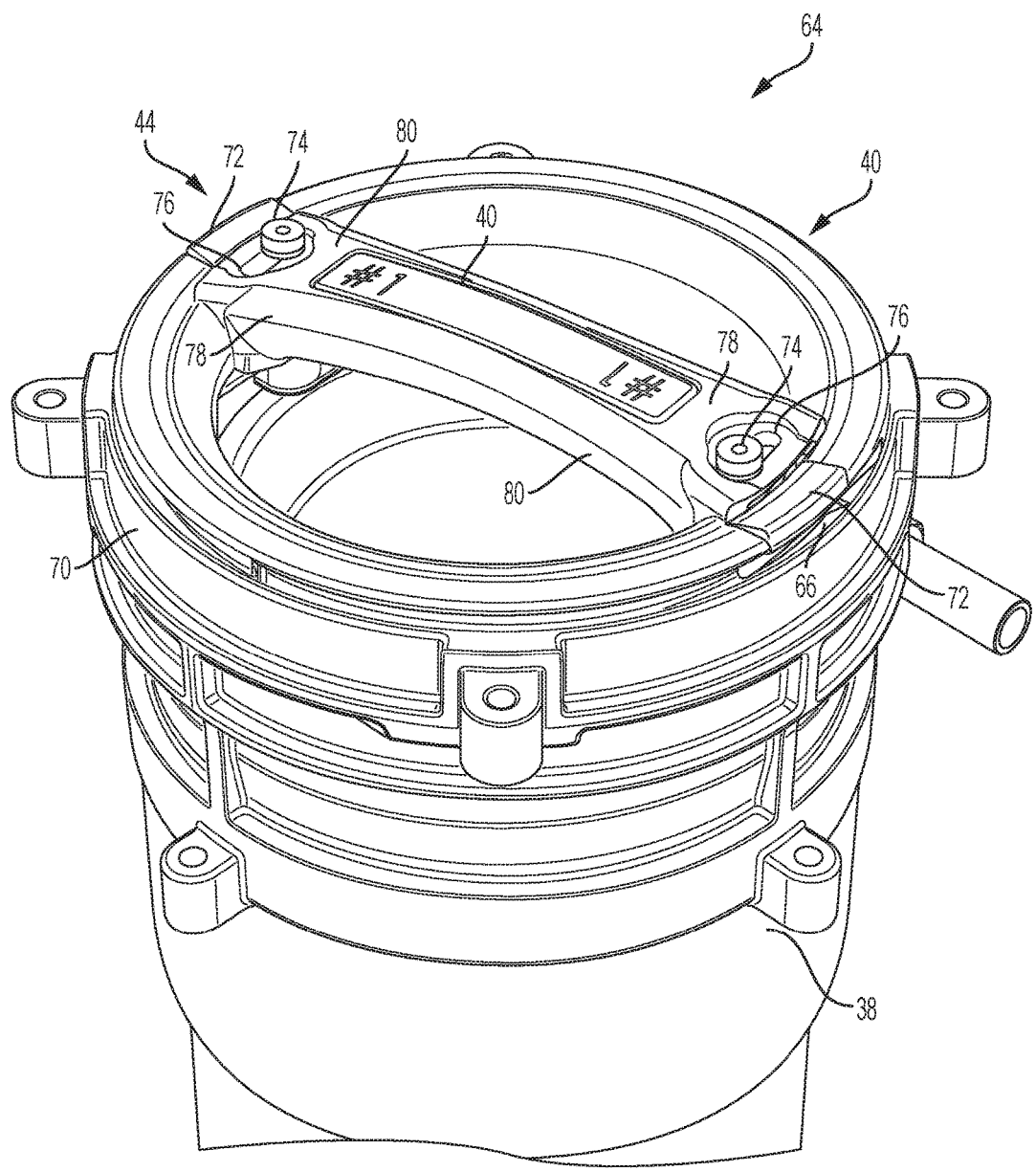
FIG. 10 is a top perspective view of the conditioning unit of FIG. 9 illustrating the locking device in an unlocked state during cap removal.
Figure 11:
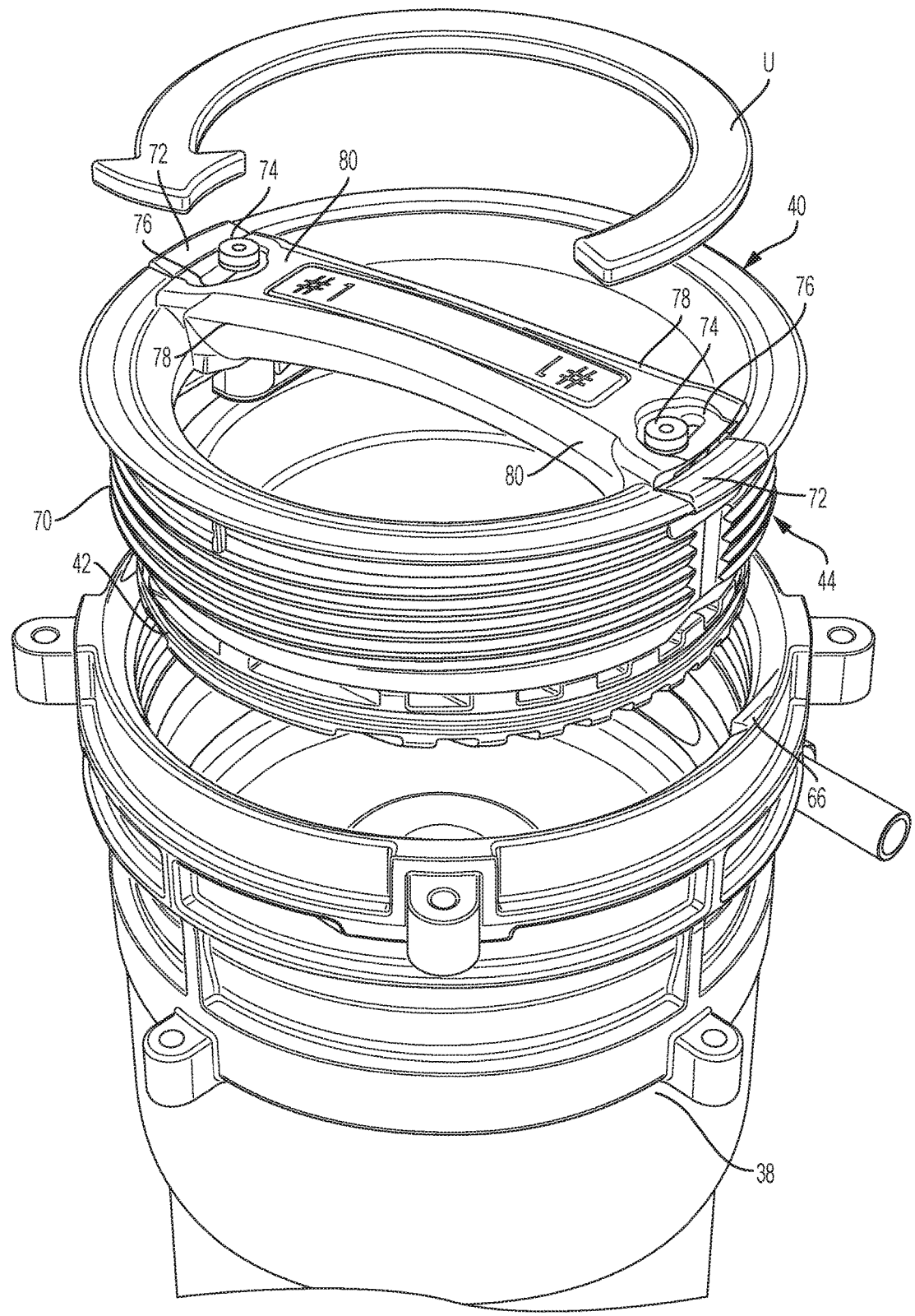
FIG. 11 illustrates the locking device of FIG. 10 in the unlocked state after cap removal.

The details of cap 40 having locking device 44 are described with simultaneous reference to FIGS. 9-11. Locking device 44 is advantageously configured so that the simple action of unscrewing cap 40 from housing 38 also moves the locking device to an unlocked state, but the action of screwing the cap to the housing puts the locking device in a locked state at or near the end of rotation.

Cap 40 is shown having locking device 44 in a locked state 62 in FIG. 9 and in an unlocked state 64 in FIG. 10. In the locked state 62, locking device 44 interacts with features 66 of housing 38 to prevent rotation of cap 40 with respect to the housing. However in the unlocked state 64, locking device 44 is moved so that it no longer interacts with features 66 of housing 38 to allow rotation of cap 40 with respect to the housing.

First portion 50 includes handle 48, an outer ring 70, and a pair of lock arms 72. Handle 48 and arms 72 are secured to outer ring 70 by a pair of guide studs 74. Handle 48 includes a slot 76 at either end through which studs 74 are received. Thus, handle 48 can move, with respect to arms 72 and outer ring 70, by sliding studs 74 in slots 76. Arms 72 are normally biased, by springs 86, to the locked state 62. In addition to springs 86, arms 72 can further include one or more springs (not shown) such as torsional springs at the pivot point of the arms with respect to outer ring 70.

It is contemplated by the present disclosure for housing 38 and cap 40 to be made of any material sufficient to withstand the use as conditioner 12. By way of example only, it is contemplated by the present disclosure for locking device 44, features 66, and lock arms 72 to be made of different material and shapes to improve the durability of the locking mechanism and in combination with the spring force increase or decrease the force required to lock/unlock. Thus, locking device 44, features 66, and lock arms 72 are contemplated by the present disclosure as being made of PVC, POM, zinc, aluminum, and any other polymer or metallic material. Moreover, it is contemplated by the present disclosure for housing 38 and/or cap 40 to be made of materials that can be manufactured by mass production processes such as, but not limited to, injection molding, die casting, machining, others, and any combinations thereof.

Handle 48 has a first position shown in FIG. 9 with respect to outer ring 70 that corresponds to locked state 62. Here, studs 74 are slid in slots 76 towards a leading edge 78 of handle 48 and arms 72 are pivoted to a lowered position in which they interact with feature 66. Leading edge 78 is defined as the edge of handle 48 that is towards the direction of unthreading U of cap 40 from housing 38.

Handle 48 also has a second position shown in FIG. 10 with respect to outer ring 70 that corresponds to unlocked state 64. Here, studs 74 are slid in slots 76 towards a trailing edge 80 of handle 48 and arms 72 are pivoted to an upper position in which they cannot interact with feature 66. Trailing edge 80 is defined as the edge of handle 48 that is towards the direction of threading T of cap 40 onto housing 38.

When the user applies force to handle 48 in the unthreading direction U as in FIG. 11, slots 76 of the handle slide on studs 74, which compresses springs 86, until the studs are towards trailing edge 80 of the handle and arms 72 are pivoted to their upper position in which they cannot interact with feature 66 or reduced the interference, allowing cap 40 to be unthreaded from housing 38.

Figure 12:
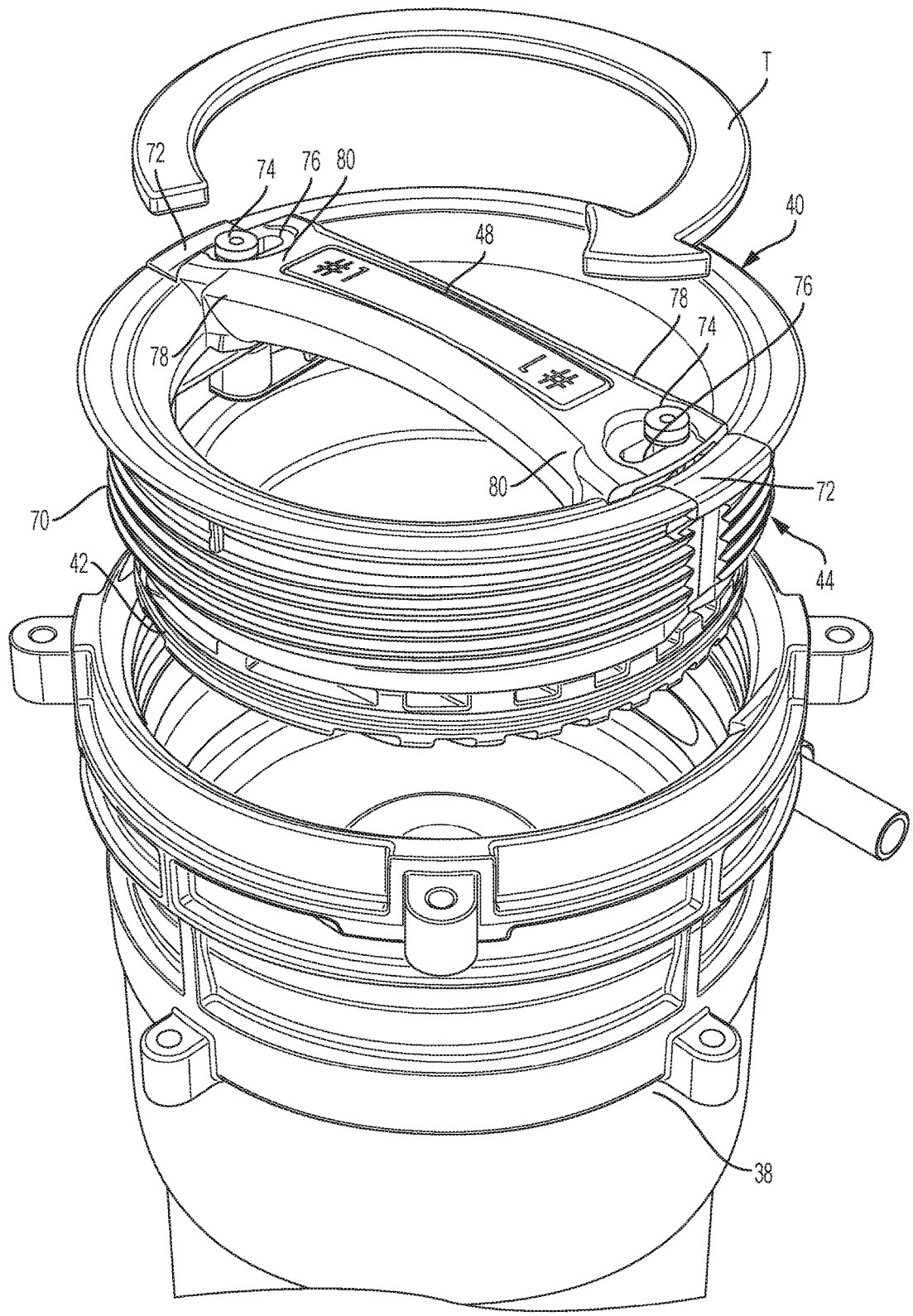
FIG. 12 is a top perspective view of the conditioning unit of FIG. 9 illustrating the locking device in an unlocked state during installation.

Conversely, when the user applies force to handle 48 in the threading direction T as in FIG. 12, slots 76 of the handle slide on studs 74, biased by springs 86, until the studs are towards leading edge 78 of the handle and arms 72 are pivoted to their lower upper position in which they interact with feature 66, locking cap 40 to housing 38.

Figure 13:
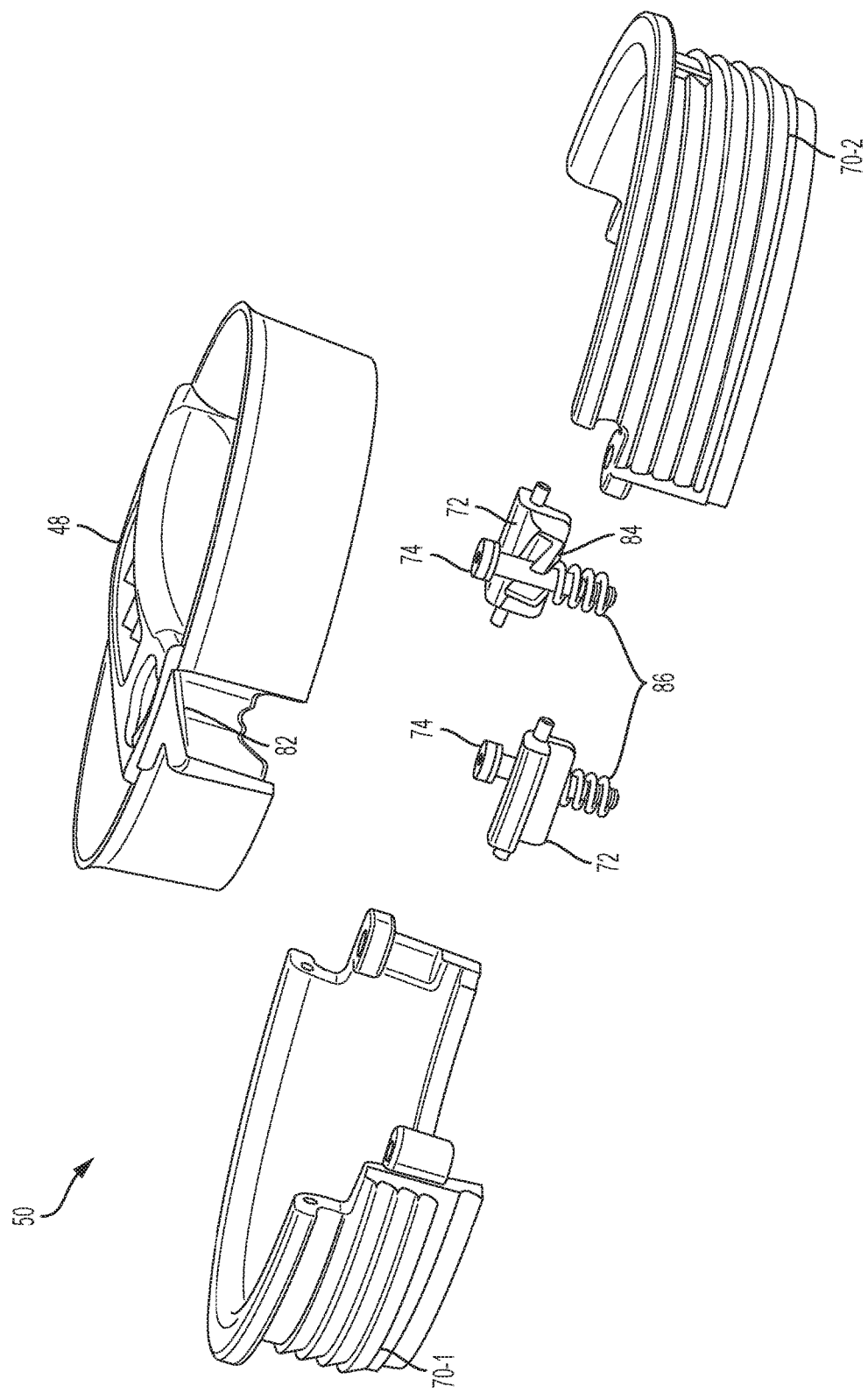
FIG. 13 is an exploded view of an exemplary embodiment of a first portion of the cap of the present disclosure.
Figure 14:
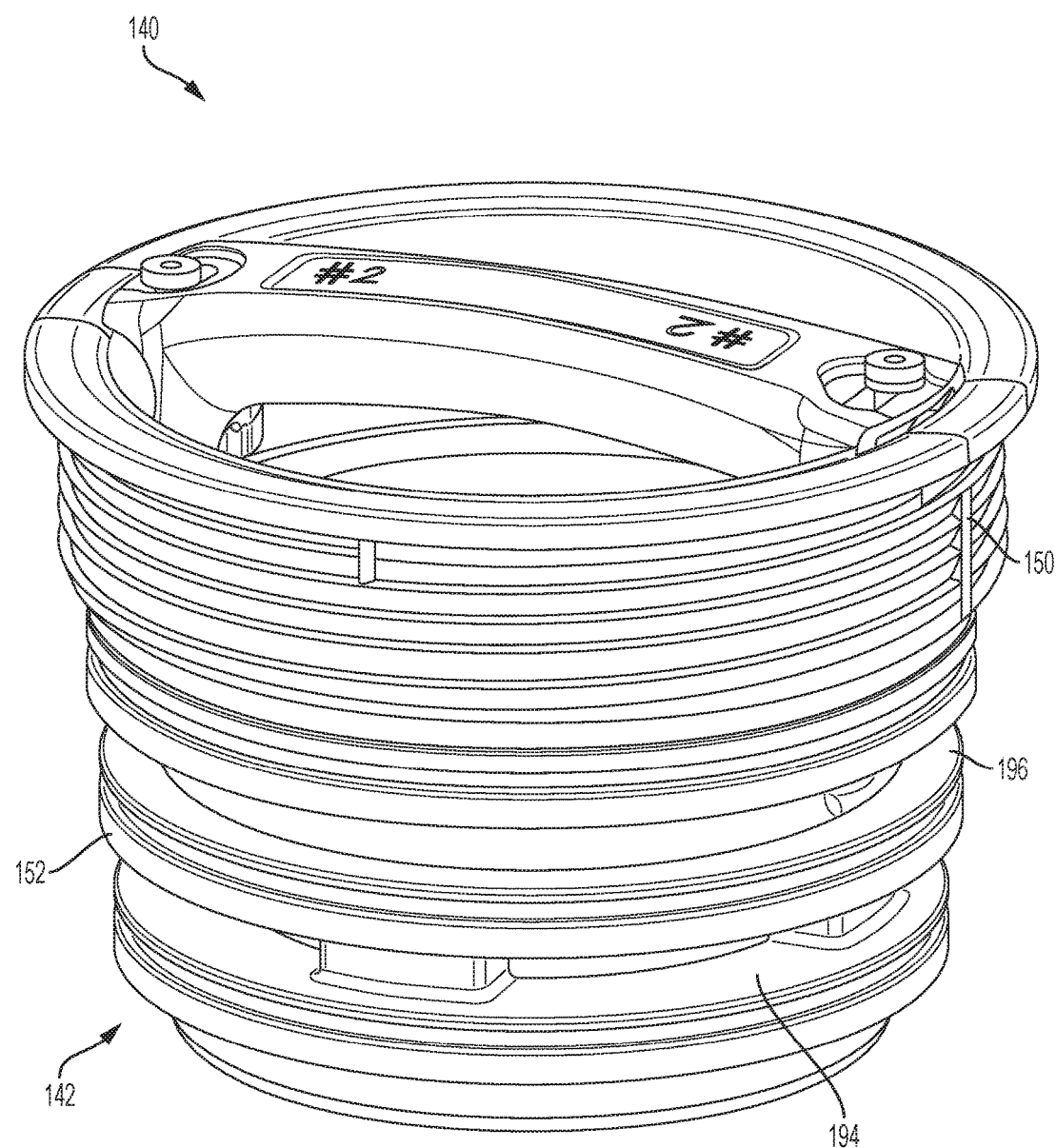
FIG. 14 is a top perspective view of an alternate exemplary embodiment of a filter cartridge sealing and removal device according to the present disclosure in use with the cap.
Figure 15:
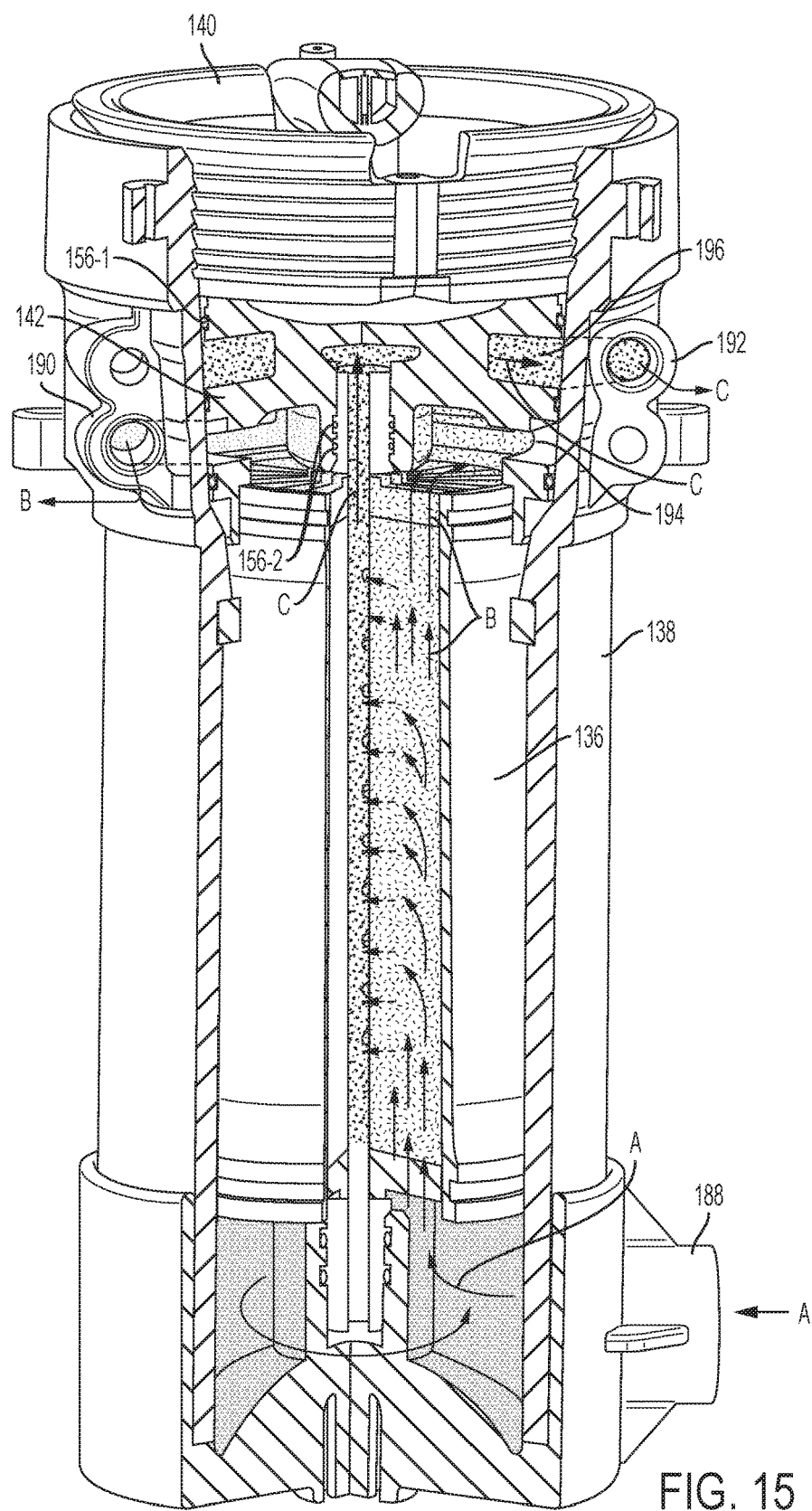
FIG. 15 is a partial sectional view of the filter cartridge sealing and removal device of FIG. 14 in use with an RO cartridge.
Figure 16:
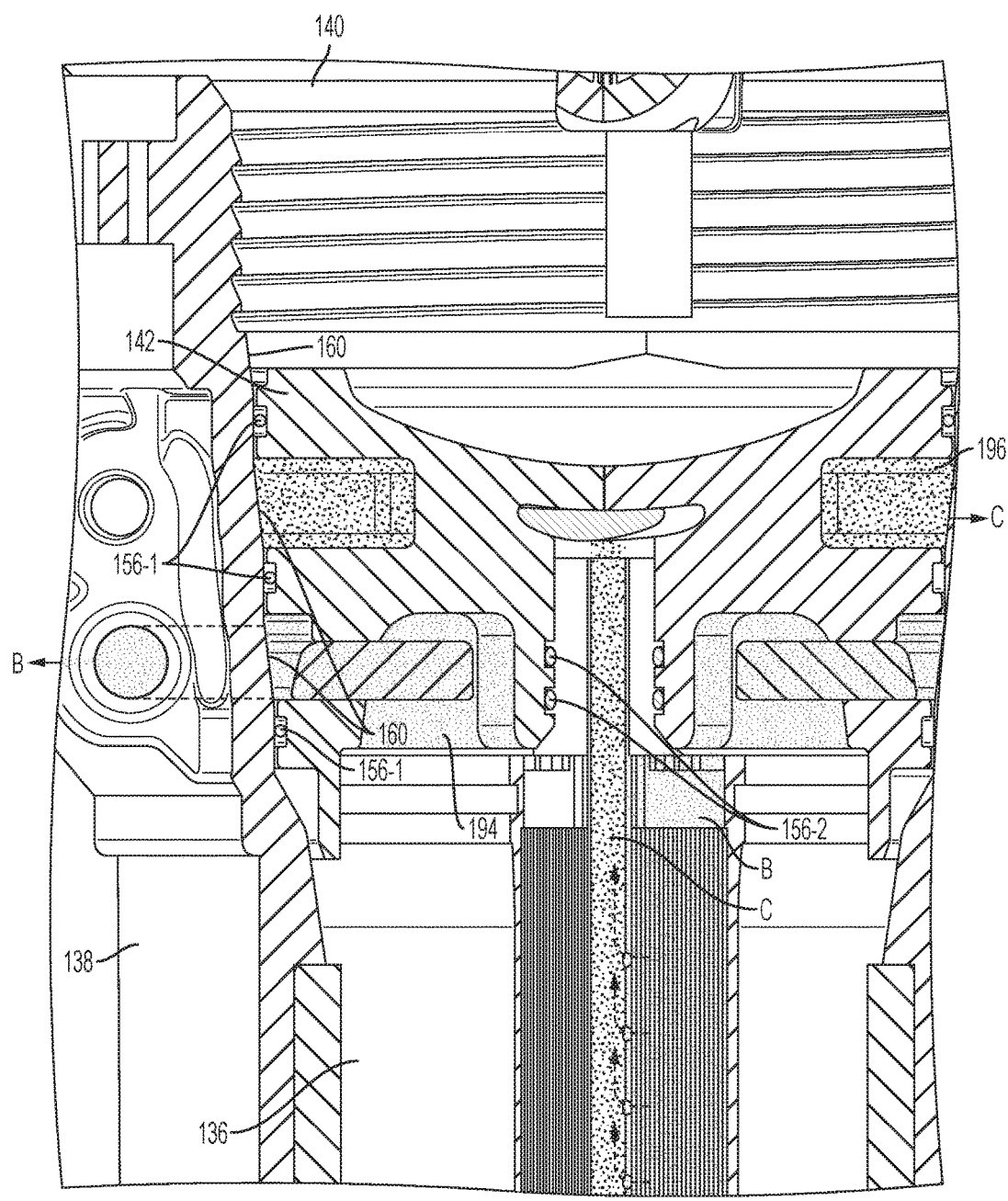
FIG. 16 is a magnified view of FIG. 15.
Figure 17:
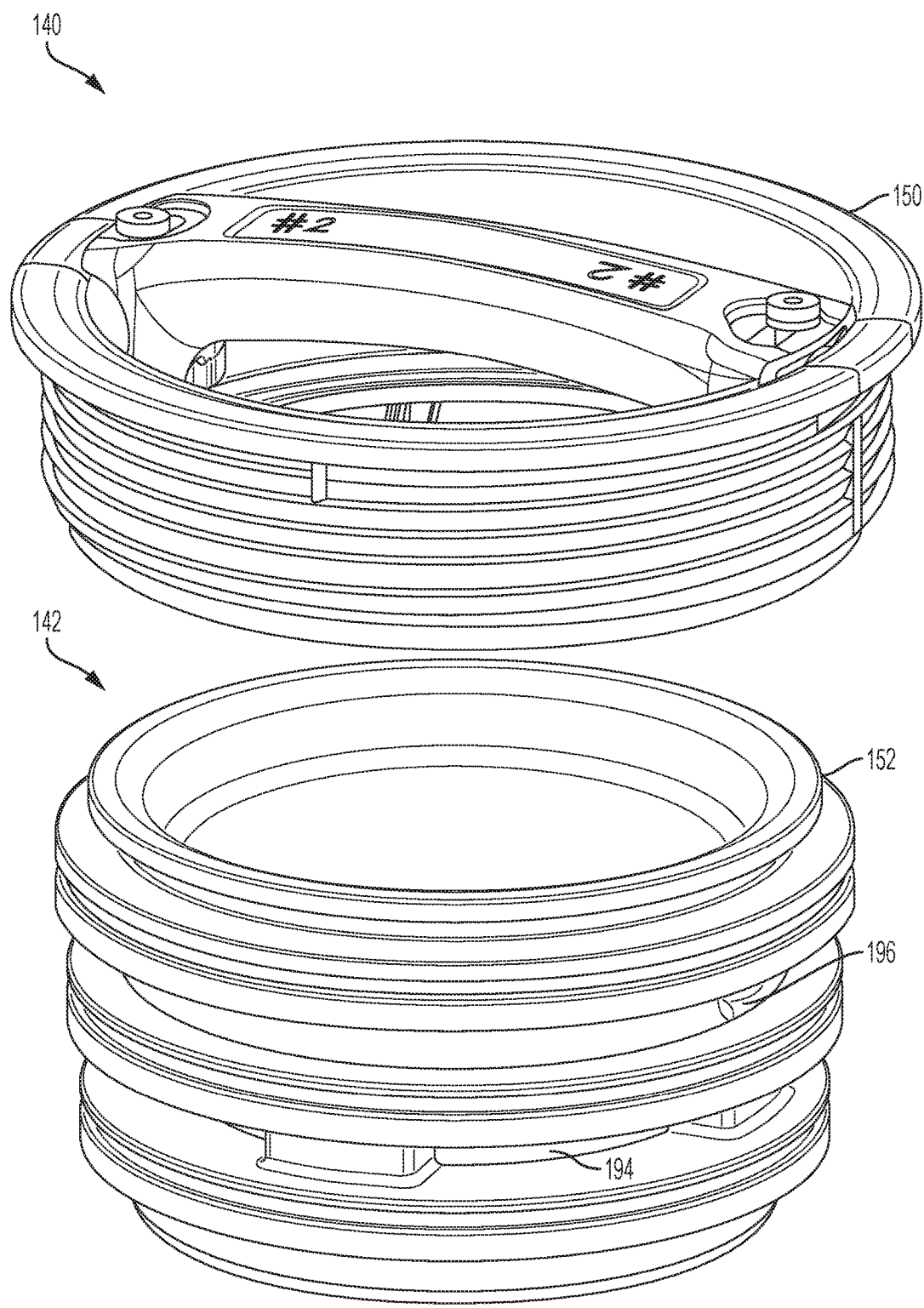
FIG. 17 is a partially exploded view of the filter cartridge sealing and removal device of FIG. 14.
Figure 18:
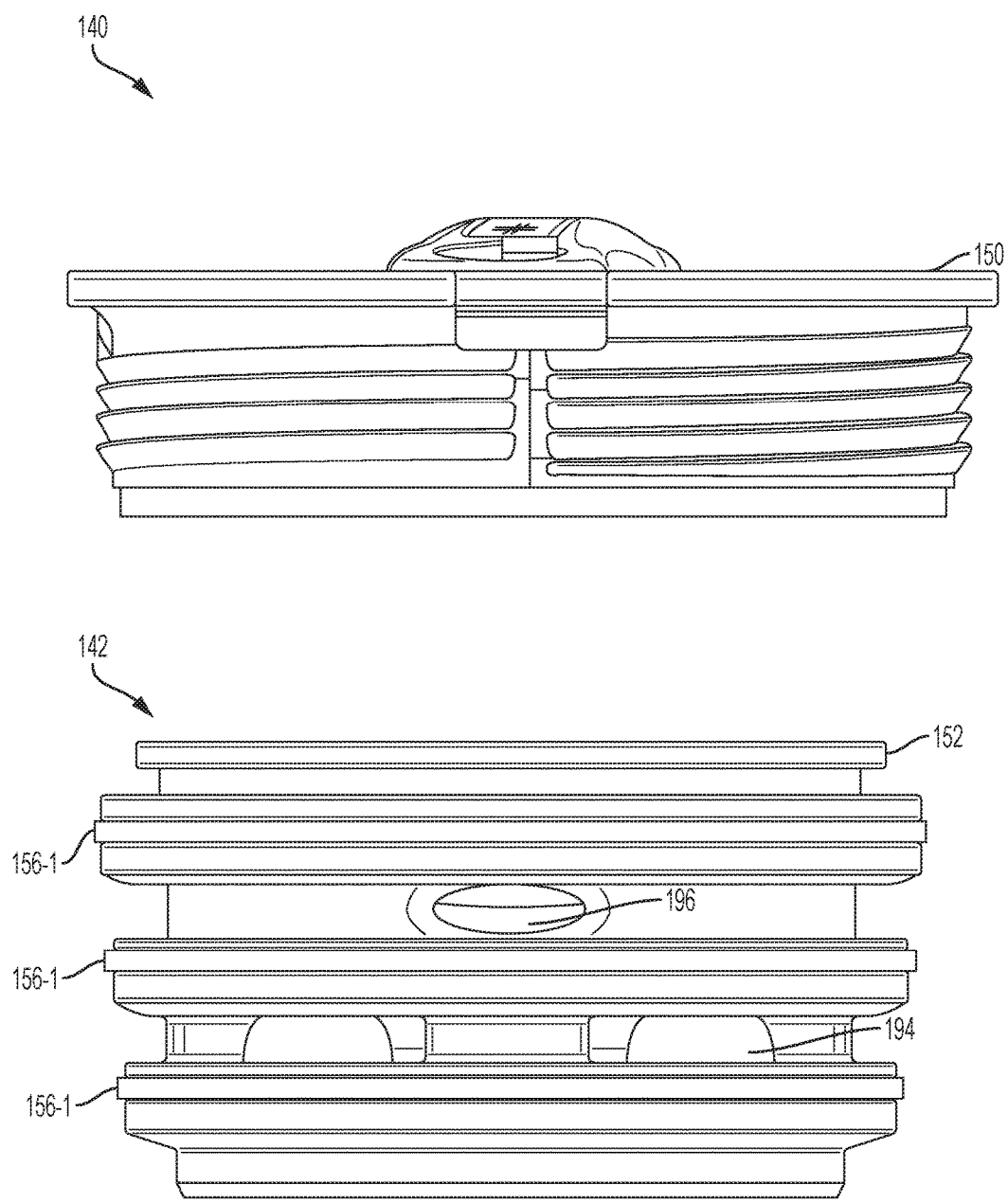
FIG. 18 is a first side exploded view of the filter cartridge sealing and removal device of FIG. 14.
Figure 19:
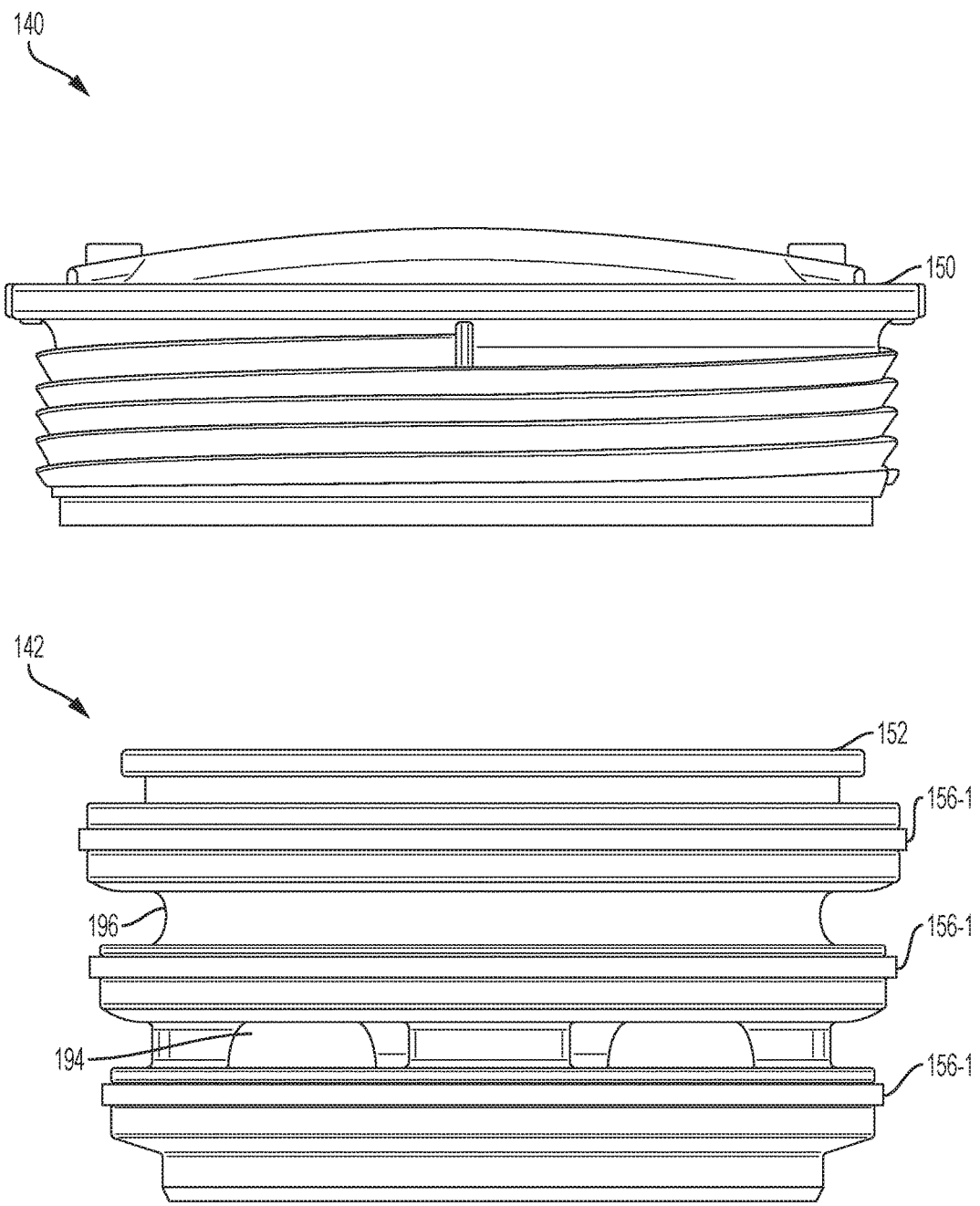
FIG. 19 is a second side exploded view of the filter cartridge sealing and removal device of FIG. 14 taken ninety degrees from the first side view.

An exemplary embodiment of the structure of first portion 50 is shown in FIG. 13. Here, outer ring 70 has a split ring structure—namely has ring portions 70-1, 70-2. Portions 70-1, 70-2 are joined to one another by studs 74 to form ring 70. When portions 70-1, 70-2 are joined to one another, arms 72 are held in position between the portions in a pivotable manner. Additionally, when portions 70-1, 70-2 are joined to one another, first portion 50 is clamped around second portion 52 in a manner that prevents movement of the first and second portions with respect to one another along axis A, yet allows the first and second portions to rotate with respect to one another. In this view, it can be seen that handle 48 has a cam surfaces 82 (only one shown) that interacts with corresponding cam surfaces 84 on arms 72 (only one shown) to pivot the arms between the upper and lower positions depending on the position of handle 48 with respect to outer ring 70.

Referring now to FIGS. 14-19, a cap 140 having an alternate exemplary embodiment of a filter cartridge sealing and removal device 142 according to the present disclosure is shown.

Cap 140 includes a first portion 150 as discussed above and a second portion 152. First portion 150 is configured to secure cap 140 to housing 138 in the manner discussed above. Second portion 152 is configured to secure the cap to filter cartridge 136, which in this embodiment is a reverse osmosis cartridge.

As is known in the art, the reverse osmosis process separates an incoming water stream (A) into a concentrate stream (B) of concentrated contaminates and a permeate stream (C) of purified water. Thus, in this embodiment, second portion 152 also acts as a manifold to collect streams (B, C) from cartridge 136 and to separately direct the flow of these streams from housing 138.

Housing 138 has an incoming water inlet 188 through which incoming stream (A) is input into conditioner 112. Housing 138 further includes a concentrate outlet 190 through which concentrate stream (B) exits conditioner 112 and a permeate outlet 192 through which permeate stream (C) exits the conditioner.

Second portion 152 includes a first or concentrate chamber 194 and a second or permeate chamber 196. When second portion 152 is sealed to cartridge 136, concentrate chamber 194 is in fluid communication with concentrate stream (B) and concentrate outlet 190, while permeate chamber 196 is in fluid communication with permeate stream (C) and permeate outlet 192.

Second portion 152 includes one or more seals 156-1 at the top surface, the bottom surface, and between chambers 194, 196. Seals 156-1 are illustrated as o-rings or gaskets that seals second portion 152 to inner surface 158 of housing 138 when cap 140 is secured to the housing. In some embodiments, inner surface 158 includes a sloped or tapered lead-ins 160, which allows cap 140 to be substantially threaded onto housing 138 before seals 156-1 are completely engaged to surface 158.

Second portion 152 further includes one or more seals 156-2 (two shown) that attach cartridge 136 to cap 140 insertion of seal 156-2 into the cartridge. Seals 156-2 are illustrated as o-rings or gaskets that seal an inner surface of second portion 152 to an outer surface of cartridge 136.

Since device 142 rotates freely with respect to cap 140, installation of the cap only requires seals 156-1, 156-2 to move with respect to cartridge 136 and housing 138 axially along axis A and, not, rotationally, which reduces the frictional force imparted to the seals. In this manner, device 142 is configured to minimize the axial friction imparted along axis A to seals 156-1, 156-2 by the interaction of the seals installation of the cap.

In short, cap 140, due to device 142, is configured to perform multiple functions in a simple, easy to use form—namely to close housing 138 in a fluid tight manner, drive cartridge 136 into and out of the housing during the closing and opening of the housing, form a manifold for the permeate and concentrate streams, and minimize damage to seals 156-1, 156-2 and reduce the forces and/or torque required during the installation and removal process.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of any claims hereafter presented.

| PARTS LIST | | |
|---|---|---|
| system 10 | lead-in 60 | permeate outlet 192 |
| conditioner 12 | locked state 62 | first chamber 194 |
| controller 14 | unlocked state 64 | second chamber 196 |
| brush 16 | features 66 | seals 156-1 |
| tubes 18 | outer ring 70 | inner surface 158 |
| pole 20 | ring portions 70-1, 70-2 | lead-ins 160 |
| surface 22 | lock arms 72 | seals 156-2 |
| frame 24 | guide studs 74 | |
| pump 26 | slot 76 | |
| conditioning units 28 | leading edge 78 | |
| pre-filter unit 30 | unthreading direction U | |
| DI unit 32 | trailing edge 80 | |
| RO unit 34 | threading direction T | |
| filter cartridge 36 | cam surfaces 82 | |
| housing 38 | cam surfaces 84 | |
| cap 40 | spring 86 | |
| cartridge device 42 | conditioner 112 | |
| locking device 44 | cartridge 136 | |
| pressure relief device 46 | housing 138 | |
| handle 48 | cap 140 | |
| first portion 50 | device 142 | |
| second portion 52 | first portion 150 | |
| axis A | second portion 152 | |
| threads 54 | incoming water stream (A) | |

PARTS LIST -continued

| | |
|---|---|
| seal 56-1 | concentrate stream (B) |
| seal 56-2 | permeate stream (C) |
| inner surface 58 | water inlet 188 |
| | concentrate outlet 190 |

What is claimed is:

1. A fluid conditioning unit, comprising:
a housing having an axis;
a cap threadably secured to and unsecured from the housing by rotation about the axis, the cap forming a removable seal with the housing when secured thereto;
a cartridge device secured to the cap in a manner that restricts movement of the cartridge device with respect to the cap along the axis but allows rotation of the cartridge device with respect to the cap about the axis; and
a filter cartridge removably secured to the cartridge device, the filter cartridge being disposed in the housing along the axis; and
wherein the cap comprises first and second portions that are secured to one another in a manner that secures the cartridge device and the cap to one another to prevent movement of the cartridge device with respect to the cap along the axis but allow rotation of the cartridge device with respect to the cap about the axis, the first portion being configured to couple the cap to the housing and the second portion being configured to couple the cap to the filter cartridge.

2. A fluid conditioning unit comprising:
a housing having an axis;
a cap threadably secured to and unsecured from the housing by rotation about the axis, the cap forming a removable seal with the housing when secured thereto;
a cartridge device secured to the cap in a manner that restricts movement of the cartridge device with respect to the cap along the axis but allows rotation of the cartridge device with respect to the cap about the axis;
a filter cartridge removably secured to the cartridge device, the filter cartridge being disposed in the housing along the axis;
a first seal for removably sealing the cartridge device and an inner surface of the housing; and
a second seal for removably sealing the cartridge device and the filter cartridge.

3. The unit of claim 2, wherein the second seal is sufficient so that the filter cartridge remains attached to the cartridge device during removal of the cap from the housing.

4. The unit of claim 1, wherein the filter cartridge is a cartridge selected from the group consisting of a particle filter cartridge, a chlorine filter cartridge, and an ion removing filter cartridge.

5. The unit of claim 1, wherein the cartridge device comprises a manifold that collect two separate fluid streams from the filter cartridge and to separately direct the two separate fluid streams from the housing.

6. The unit of claim 1, wherein the filter cartridge is a reverse osmosis membrane, the housing comprising an incoming water inlet, a concentrate outlet, and a permeate outlet, the incoming water inlet being in fluid communication with one end of the reverse osmosis membrane, the cartridge device being in fluid communication with an opposite end of the reverse osmosis membrane.

7. The unit of claim 6, wherein the cartridge device comprises a manifold that directs concentrate from the reverse osmosis membrane to the concentrate outlet and directs permeate from the reverse osmosis membrane to the permeate outlet, the cartridge device sealing the concentrate and permeate from one another.

8. A fluid conditioning unit, comprising:
a housing having an axis;
a cap threadably secured to and unsecured from the housing by rotation about the axis, the cap forming a removable seal with the housing when secured thereto;
a cartridge device secured to the cap in a manner that restricts movement of the cartridge device with respect to the cap along the axis but allows rotation of the cartridge device with respect to the cap about the axis;
a filter cartridge removably secured to the cartridge device, the filter cartridge being disposed in the housing along the axis; and
a locking device that locks the cap to the housing once the cap is threadably secured to the housing.

9. The unit of claim 8, wherein the locking device comprises a handle usable by a user to impart threading and unthreading forces to the cap.

10. The unit of claim 9, wherein the locking device is configured so that the unthreading forces on the handle moves the handle, which in turn moves locking device to an unlocked state.

11. The unit of claim 9, wherein the locking device is configured so that the threading forces on the handle moves the handle, which in turn moves the locking device to a locked state once the cap is threadably secured to the housing.

12. The unit of claim 8, wherein the cap further comprises a pressure relief device configured to relieve pressure from within housing when removing the cap from the housing.

13. The unit of claim 12, wherein the pressure relief device is positioned adjacent to the handle.

14. The unit of claim 8, wherein the cap comprises first and second portions that are secured to one another in a manner that secures the cartridge device and the cap to one another to prevent movement of the cartridge device with respect to the cap along the axis but allow rotation of the cartridge device with respect to the cap about the axis, the locking device comprising a locking arm secured between the first and second portions.

15. A fluid conditioning unit, comprising:
a housing having a first thread and a locking feature; and
a cap having a second thread, a handle and a locking arm, the first and second threads being selectively engagable and disengageable from one another,
the locking arm being movable between a locked position and an unlocked position, the locking arm, when in the locked position, being receivable in the locking feature to prevent unthreading of the cap from the housing, and the locking arm, when in the unlocked position, being free from the locking feature to allow unthreading of the cap from the housing, the handle being movable, with respect to the cap during threading and unthreading of the cap from the housing, between a first position and a second position, the first position corresponding to the locked position of the locking arm and the second position corresponding to the unlocked position of the locking arm so that when a user applies an unthreading force to the handle, the handle moves to the second position and moves the arm to the unlocked position and so that when a user applies a threading force to the handle, the handle moves to the first position and moves the arm to the locked position.

16. The unit of claim 15, wherein the cap further comprises a guide stud operatively securing the handle and the locking arm to the cap, the handle having a slot through which the stud is received so that the handle can move, with respect to the cap during threading and unthreading of the cap from the housing, by the stud sliding in the slot between the first and second positions.

17. The unit of claim 16, wherein the cap further comprises an outer ring having first and second portions, the guide stud secures the handle, the locking arm, and the first and second portions of the outer ring to one another.

18. The unit of claim 17, wherein the locking arm is held in position between the first and second portions in a pivotable manner with the locking arm normally biased to the locked position.

19. The unit of claim 17, wherein the handle and the first and second portions comprise corresponding cam surfaces that interact with one another during movement of the handle between the first and second positions to move the arm between the locked and unlocked positions, respectively.

20. The unit of claim 16, wherein the handle is normally biased to the first position, which normally biases the arm to the locked position.

* * * * *